(12) United States Patent
Wu et al.

(10) Patent No.: US 6,822,798 B2
(45) Date of Patent: Nov. 23, 2004

(54) TUNABLE OPTICAL FILTER

(75) Inventors: Xingtao Wu, Woburn, MA (US);
Cardinal Warde, Hopkinton, MA (US)

(73) Assignee: Optron Systems, Inc., Bedford, MA (US)

( * ) Notice: Subject to any disclaimer, the term of this patent is extended or adjusted under 35 U.S.C. 154(b) by 55 days.

(21) Appl. No.: 10/215,576

(22) Filed: Aug. 9, 2002

(65) Prior Publication Data

US 2004/0027671 A1 Feb. 12, 2004

(51) Int. Cl.[7] .............................................. G02B 27/00
(52) U.S. Cl. ..................... 359/578; 359/260; 359/290; 356/454; 356/506
(58) Field of Search ............................... 359/577–579, 359/260, 589, 290, 291, 224; 356/454, 506, 519; 385/18

(56) References Cited

U.S. PATENT DOCUMENTS

| | | | | |
|---|---|---|---|---|
| 5,414,726 A | * | 5/1995 | Raj et al. ...................... | 372/26 |
| 6,285,504 B1 | * | 9/2001 | Diemeer ...................... | 359/578 |
| 6,400,738 B1 | * | 6/2002 | Tucker et al. .................. | 372/20 |
| 6,466,354 B1 | * | 10/2002 | Gudeman .................... | 359/247 |
| 6,512,625 B2 | * | 1/2003 | Mei et al. .................... | 359/290 |
| 6,529,311 B1 | * | 3/2003 | Bifano et al. ................ | 359/291 |
| 2002/0167730 A1 | * | 11/2002 | Needham et al. ........... | 359/578 |

* cited by examiner

*Primary Examiner*—Leo Boutsikaris
(74) *Attorney, Agent, or Firm*—Iandiorio & Teska

(57) ABSTRACT

A tunable optical filter including at least one deformable membrane actuator. The actuator may include an array of a thousand or millions of individual actuator cells for strength and mechanical robustness. The deformable membrane actuator including a first primary substrate having a first optical portion, an electrically conductive and deformable membrane, an electrically conductive primary substrate electrode and a membrane support structure. The substrate electrode and the membrane support structure are disposed on or adjacent to the first primary substrate, the deformable membrane being supported by the membrane support structure, and a second substrate having a second optical portion. The second substrate is supported by a load support structure disposed on one surface of the deformable membrane and is located a distance from the first substrate. When a voltage is applied between the deformable membrane and the electrically conductive layer, the deformable membrane deforms and alters the distance between the first optical portion and the second optical portion.

37 Claims, 17 Drawing Sheets

TUNABLE OPTICAL FILTER

FIELD OF THE INVENTION

This invention relates to tunable optical filters.

BACKGROUND OF THE INVENTION

In many optical applications, it is desirable to use a tunable optical filter, such as an etalon, to modulate the intensity of narrow-band light. A tunable optical filter, which is a bandpass filter, is typically made up of two partially reflective mirrors or surfaces separated by a gap to form a cavity. Devices with this structure are called etalons. The spectral characteristics of a tunable optical filter are generally determined by the reflectivity and gap spacing (cavity length) of the mirrors or surfaces. Varying the effective cavity length of the device tunes the center wavelength of the spectral bandpass of the etalon. The effective cavity length may be varied by altering the actual physical gap size, the refractive index of the gap medium, or both.

Various micro-electromechanical system (MEMS) based tunable optical filters have been investigated for the purposes of cost-effective miniaturization and batch fabrication, but the tradeoff between optical performance and MEMS miniaturization limits their commercialization.

U.S. Pat. No. 5,022,745, incorporated herein by this reference, describes an electrostatically deformable single-crystal mirror having a highly-conductive thick substrate layer supporting a highly-conductive thin membrane. The membrane is separated from the substrate by an insulating layer. The center of the insulating layer is etched away to form a cavity. The outer surface of the membrane is polished and coated with a dielectric material to form one mirror. A voltage is applied between the membrane and the substrate to cause the membrane and its mirror to deform.

This prior art design has numerous deficiencies. First, because the dielectric layer is directly attached to the deformable membrane, the potential exists for the mirror to curl. Second, the highly conducting membrane itself is disposed within the optical volume. The optical volume is the region through which light travels during operation of the device. The highly conducting membrane can absorb certain wavelengths which therefore cannot be selected for filtering. Also, the dielectric layer on the membrane will deform with the deformable membrane, causing errors. Moreover, the optical portion/path and the actuating structure are physically and electrically coupled and consequently there is a tradeoff between the substrate thickness and elastic stiffness (factors which partially determine the actuation voltage).

U.S. Pat. No. 5,283,845, also incorporated herein by this reference, discloses changing the effective cavity length between two mirrors by varying the axial length of a piezo actuator. This design requires placing two mirrors at the inner ends of two elongated members mounted on glass end plates. An annular or ring piezo actuator extends between the end plates, and is connected via a glass washer at one end and an annular aluminum split ring spacer and a glass washer at the other end. This design is thus unduly complicated. Moreover, because there are only two actuators to control the gap between the two mirrors, the device does not offer fine tuning adjustment to average out the errors caused by non-uniformity of the gap.

SUMMARY OF THE INVENTION

It is therefore an object of this invention to provide a tunable optical filter in which the actuating structure which adjusts the spacing between the mirrors does not occlude the optical path through the mirrors.

It is a further object of this invention to provide a tunable optical filter that is less expensive and less complicated than prior art designs.

It is a further object of this invention to provide a tunable optical filter in which the actuator embodiment is not in the optical path between the two mirrors.

It is a further object of this invention to provide a tunable optical filter that avoids the potential for the mirrors to deform or curl.

It is a further object of this invention to provide a tunable optical filter which can be fine-tuned.

It is a further object of this invention to provide a tunable optical filter in which the effects of errors caused by defects in some deformable membrane actuators or arising from other causes can be compensated for by the use of a plurality (array) of individual deformable membrane actuators (actuator cells).

It is a further object of this invention to provide a tunable optical filter in which the flatness of the optical portion is more easily maintained than in the prior art.

This invention results from the realization that an improved tunable optical filter which eliminates the numerous problems associated with prior art tunable optical filters, including light ray absorption, mirror deformation, lack of error compensation, and the inability to fine tune the optical filter, is achieved with a multi-cell deformable membrane actuator located between two substrates, each substrate including optical portions that are moved within closer proximity to each other as the deformable membranes deform (flex) in response to voltage applied to the deformable membrane. Thus, the deformable membrane actuator is separate from, and not a part of any optical portion and the deformable membrane can be located outside of the optical volume while it varies the spacing between the two optical portions.

The present invention provides in one embodiment a tunable optical filter comprising a first optical portion, a second optical portion located a distance from the first optical portion and at least one deformable membrane actuator that is configured to alter the distance between the first optical portion and the second optical portion, the deformable membrane actuator located outside of an optical volume that is defined by the location of the first optical portion and the location of the second optical portion. Optionally, a first primary substrate includes the first optical portion and a second primary substrate includes the second optical portion.

The deformable membrane actuator includes a deformable membrane having electrically conductive properties, a (first) membrane support structure, and an electrode layer forming at least one deformable membrane actuator cell. The membrane support structure being attached to and disposed between the deformable membrane and the electrode layer. Optionally, the electrode layer can be disposed onto the first primary substrate. A voltage applied between the deformable membrane and the electrode layer causes the deformable membrane to deflect towards the electrode layer.

Optionally, the deformable membrane actuator comprises a (second) load support structure which supports a load. In some embodiments, the load is the second primary substrate and the load support structure is attached to the second primary substrate. In these embodiments, the deformable membrane is attached to and disposed between the membrane support structure and the load support structure.

In the preferred embodiment, the deformable membrane actuator comprises a plurality of deformable membrane actuator cells. A deformable membrane actuator cell includes at least a portion of the deformable membrane having electrically conductive properties, at least a portion of the (first) membrane support structure and at least a portion of the electrode layer, the portion of the (first) membrane support structure being disposed between the portion of the deformable membrane and the portion of the electrode layer and forming a deformable membrane actuator well, and where a voltage applied between the portion of the electrode layer and the portion of the deformable membrane causes the portion of the deformable membrane to deflect into the deformable membrane actuator well and towards the portion of the electrode layer.

Optionally, the deformable membrane actuator cell comprises at least a portion of a (second) load support structure which supports a load. In some embodiments, the load is the second primary substrate and the portion of the load support structure is attached to the second primary substrate. In these embodiments, the deformable membrane is attached to and disposed between the portion of the membrane support structure and the portion of the (second) load support structure.

In some embodiments, the membrane support structure includes a plurality of spaced members upstanding from the first substrate and the (second) load support structure includes at least one load support structure member which attaches to the deformable membrane at a location between the spaced members of the membrane support structure.

In some embodiments, the (first) membrane support structures and (second) load support structures each include one or more members that are each disposed at locations along the deformable membrane so that the deformation of the deformable membrane alters the distance between the first primary substrate and the second primary substrate.

In some embodiments, members of the membrane support structure engage the deformable membrane at a first set of locations, members of the load support structure engage the deformable membrane at a second set of locations. Each location of the second set of locations is located in between locations of the first set of locations.

In some embodiments where the support structure is an array of bars, the depth of the membrane support structure may be substantially larger than the height or width of the membrane support structure and may also be substantially larger than the distance of separation between the members of the membrane support structure of the single deformable membrane actuator.

In other embodiments the depth of the membrane support structure may be comparable to the distance of separation between the members of the membrane support structure of a single deformable membrane actuator.

In some embodiments, the load support structure may be an array of individual posts or bars that may in cross-section be square, rectangular, hexagonal, circular, oval, elliptical or other shapes. In these embodiments the depth of the load support structure may be substantially larger than the height or width of the load support structure.

In some embodiments, the tunable optical filter includes least two deformable membrane actuators, each deformable membrane actuator located adjacent to and on opposite sides of the first and second optical portions.

In some embodiments the first optical portion is one or more coatings disposed on the first primary substrate and/or the second optical portion is one or more coatings disposed on the second primary substrate.

In some embodiments, the first optical portion is a discrete optical element located on or within the first primary substrate.

In some embodiments, the second optical portion is one or more coatings disposed on the second primary substrate. In some embodiments, the second optical portion is a discrete optical element located on or within the second primary substrate.

In some embodiments, the first optical portion is coating deposited on a secondary transparent substrate that is embedded in the first primary substrate and/or the second optical portion is coating deposited on a secondary transparent substrate that is embedded in the second primary substrate.

In some embodiments, the first optical portion is a thin-film mirror that bridges a hole or aperture located within the first primary substrate and/or the second optical portion is a thin-film mirror that bridges a hole or aperture located within the second primary substrate.

In some embodiments the first optical portion includes an opposing optical element, such as antireflection coating, disposed on an opposing surface of the first substrate. In some embodiments, the second optical portion includes an opposing optical element, such as antireflection coating, disposed on an opposing surface of the second substrate.

In some embodiments, the first primary substrate is opaque and has a transparent secondary substrate embedded within it and/or the second primary substrate is opaque and has a transparent secondary substrate embedded within it.

In some embodiments, the first primary substrate is a transparent optical flat plate and/or the primary second substrate is a transparent optical flat plate.

In some embodiments the tunable optical filter includes a housing about the first and second substrates, the housing includes a first optical window that is optically aligned with the first optical portion and a second optical window that is optically aligned with a second optical portion.

In some embodiments the electrode layer includes a plurality of independent electrodes and where each of the plurality of electrodes is controlled by a separate voltage or current source. In some embodiments the deformable membrane is segmented into a plurality of contiguous portions where each contiguous portion spans at least one deformable membrane actuator cell. In some embodiments, a group of one or more of the plurality of contiguous portions of the deformable membrane is electronically coupled to one or more of the plurality of independent electrodes.

In some embodiments, the group of one or more of the plurality of contiguous portions of the deformable membrane is electronically coupled exclusively to the one or more of the plurality of electrodes. In some embodiments, the one or more of the plurality of electrodes is controlled by a separate voltage or current source.

In some embodiments the deformable membrane includes a separate electrically conductive layer (membrane electrode). In some embodiments, an electrically conductive layer is deposited onto the portion of the deformable membrane. In other embodiments, the deformable membrane itself is an electrically conductive layer (membrane electrode).

In some embodiments, the membrane support structure comprises at least one wall (ring) disposed above the first primary substrate that forms a membrane actuator well. Optionally, the at least one wall (ring) disposed above the first primary substrate forms a square shaped membrane actuator well. Optionally, the at least one wall (ring) disposed above the first primary substrate forms a hexagonally shaped membrane actuator well.

In some embodiments, the membrane support structure comprises at least one cavity bored into the first primary substrate that forms a membrane actuator well. Optionally, the at least one cavity is arranged into a square pattern. Optionally, the at least one cavity is arranged into a hexagonal pattern. Other patterns can be used.

In some embodiments, the membrane support structure comprises at least one support member disposed above a first substrate that forms at least one membrane actuator well. Optionally, the at least one support member forms a square shaped membrane actuator well. Optionally, the at least one support member forms a hexagonal shaped membrane actuator well. Other shapes can be formed.

The present invention provides in another embodiment, a deformable membrane actuator comprising a deformable membrane having electrically conductive properties, a membrane support structure and an electrode layer, the membrane support structure being disposed between the deformable membrane and the electrode layer and forming at least one well and where a voltage applied between the electrode layer and the deformable membrane causes the deformable membrane to deflect into the well and towards the electrode layer.

Optionally, the deformable membrane actuator includes a load support structure, that is disposed above the deformable membrane and that supports a load located a distance from the electrode layer and where deflection of the deformable membrane alters the distance between the load and the electrode layer.

Optionally, the deformable membrane actuator includes a large plurality of deformable membrane actuator wells to control the movement and position of a load that is substantially heavier than is possible with conventional electrostatic (MEMS) actuator technologies.

The present invention also provides in another embodiment, an array of tunable optical filters having a first substrate including a first plurality of first optical portions, a first plurality of second substrates where each second substrate includes a second optical portion. Each second optical portion is disposed proximate to each first optical portion to form an optical volume through which light travels and includes a second plurality of deformable membrane actuators that are each disposed between the first substrate and each second substrate and disposed outside of each optical volume formed between each said first optical portion and each said second optical portion that is proximate to the first optical portion. Each of the plurality of deformable membrane actuators are configured to alter the distance between each said first optical portion and each said second optical portion.

In some embodiments, the membrane support structure may be an array of individual posts or bars that can have varying cross-sectional shapes. For example, cross-sections may be square, rectangular, hexagonal, circular, oval, elliptical, triangular, triangular with concave sides or other shapes.

In other embodiments, the membrane support structure may be an array of one or more walls that may be square, rectangular, hexagonal, circular, semi-circular, oval, elliptical or other shapes. These walls may be part of individual single-cell actuators, or the walls may be connected side-by-side to form a continuous or discontinuous support web for the membrane or membranes of a multi-cell deformable membrane actuator.

In other embodiments, the membrane support structure may be a substrate with cavities (wells) cut or etched into it. These cavities can have varying shapes. For example, these cavities may be square, rectangular, hexagonal, circular, oval, elliptical or other shapes.

In some embodiments, an electrode layer (substrate electrode) is disposed on the first substrate so as to at least cover the region of the first substrate that lies between members of the membrane support structure. In other embodiments, the first substrate is itself, an electrode.

In some embodiments there is a separate contiguous deformable membrane for each deformable membrane actuator cell. In other embodiments the deformable membrane is continuous (un-segmented) across a plurality of deformable membrane actuator cells. In other embodiments the deformable membrane is segmented into multiple contiguous portions, each contiguous portion is disposed across the plurality of deformable membrane actuator cells. In some embodiments the deformable membrane is segmented into multiple contiguous portions across an elongated deformable membrane actuator well.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
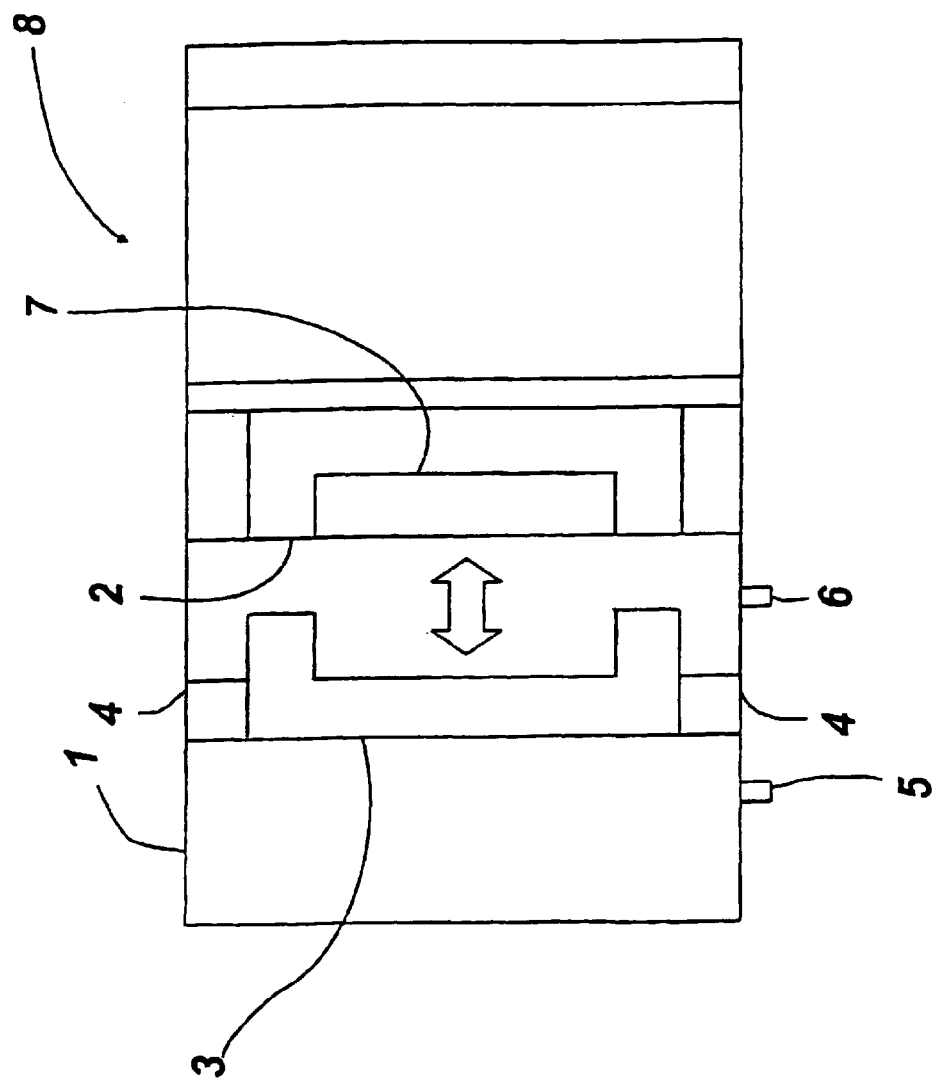
FIG. 1 is a schematic cross-sectional view of a prior art tunable optical filter.

As discussed in the Background section above, prior art optical filter 8, FIG. 1 (see U.S. Pat. No. 5,022,745) includes an electrostatically deformable single crystal mirror having highly conductive thick substrate layer 1 and highly conductive thin membrane layer 2. Membrane layer 2 is separated from thick layer 1 by insulating layer 4. The center of insulating layer 4 is etched away to form cavity 3. The outer surface of membrane layer 2 is polished and coated with a dielectric layer to form mirror 7. The thick substrate layer 1 is a transmitting mirror. A voltage is applied to electrical contacts 5 and 6 to establish a potential difference between thin membrane layer 2 and thick substrate layer/transmitting mirror 1. When the voltage is applied to electrical contacts 5 and 6, the resulting electrostatic forces cause thin membrane 2 having mirror 7 thereon to deform and be attracted to thick substrate layer/transmitting mirror 1. The result is that certain wavelengths can be filtered as the distance between mirror 7 and mirror 1 changes, as is known in the art.

As also delineated in the Background section above, this design has several shortcomings. Because mirror 7 is located directly on flexible membrane 2, mirror 7 can curl. Also, since conducting membrane 2 is in the optical path between mirrors 7 and 1, it can absorb certain wavelengths precluding them from being selected for transmission through mirrors 7 and 1.

Figure 2:
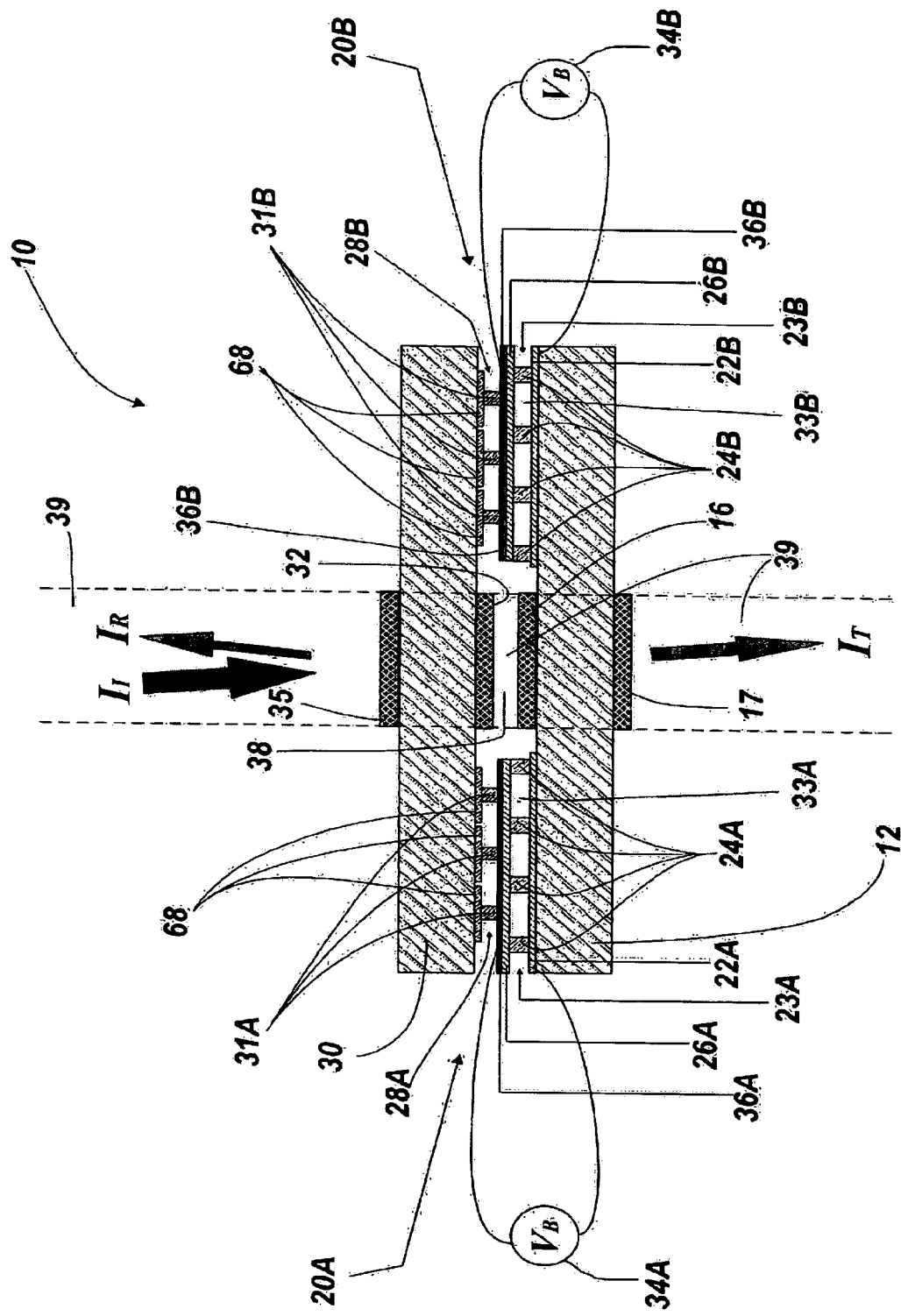
FIG. 2 is a schematic cross-sectional view of one embodiment of a tunable optical filter in accordance with this invention.
Figure 2A:
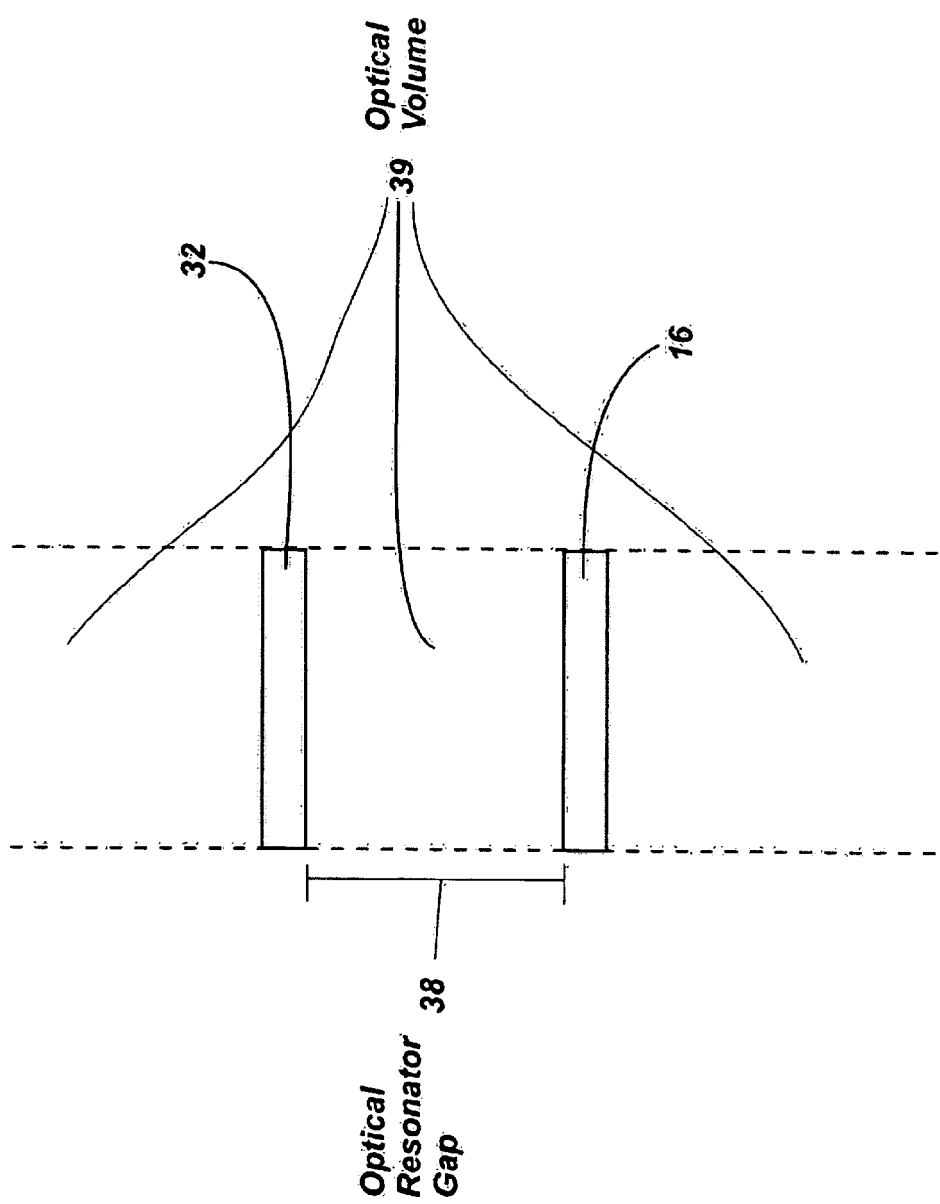
FIG. 2A is an enlarged schematic cross-sectional view of an optical volume and optical resonator gap as shown in FIG. 2.

Referring to FIG. 2, tunable optical filter 10, in accordance with this invention, includes, in this particular embodiment, first substrate 12 having at least a first optical portion 16 and a second substrate 30 having second optical portion 32. An optical cavity or resonator volume is formed in the three dimensional volume located between first optical portion 16 and second optical portion 32. See also FIG. 2A. Optical volume 39 is the volume of space occupied by light traveling between and outside optical portions 16 and 32. Optical volume 39 includes the optical resonator volume and extends away from the device 10 (Best shown in FIG. 2A). Deformable membrane actuator cell groups 20A, 20B are disposed between first substrate 12 and second substrate 30 outside of optical volume 39.

The cross sectional view of deformable membrane actuator cells 20A, 20B may each represent one multi-cell actuator or one or more clusters or groups of single-cell actuators. Each individual deformable membrane actuator cell within a cluster may share a common first (substrate) electrode layer (electrically conductive layer), and the clusters of deformable membrane actuator cells 20A, 20B may completely surround optical portions 16 and 32 for maximum stability and ruggedness (Best shown in FIGS. 12A and 12B).

Figures 8A, 8B:
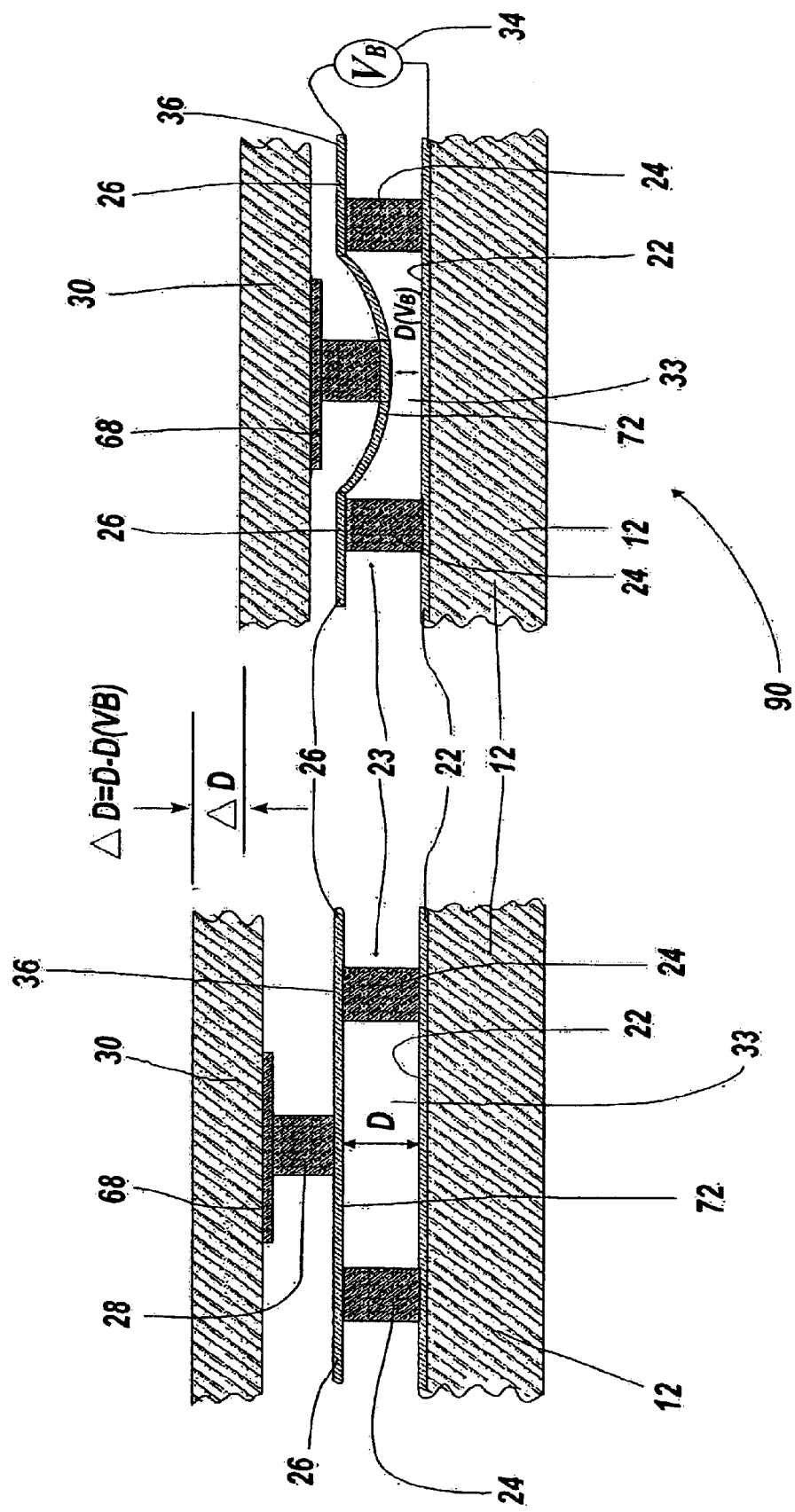
FIGS. 8A and 8B are enlarged schematic cross-sectional views illustrating the mechanism of the deformable membrane actuator in accordance with one embodiment of the subject invention.

In this embodiment, deformable membrane actuators each comprise a plurality of deformable membrane actuator cells 20A, 20B. An individual deformable membrane actuator cell is best seen in FIGS. 8A and 8B. Each deformable membrane actuator cell comprises a pair of adjacent membrane support members 24A, 24B, load support member 31A, 31B located in between the pair of adjacent membrane support members, and deformable membrane 26A, 26B spanning and supported by the pair of adjacent membrane support members respectively. Deformable membrane 26A, 26B is electrically conductive and may be segmented into multiple contiguous membrane portions (abutting or attached to each other) or embodied as one contiguous membrane spanning across a plurality of deformable membrane actuator cells.

Membrane support members 24A, 24B are attached to and disposed above first substrate 12 as shown. The plurality of membrane support members 24A, 24B each collectively constitute the membrane support structures 23A, 23B respectively. In this embodiment, the membrane support structure members 24A, 24B are disposed upstanding from the first substrate. In this embodiment, each of support members 24A, 24B is bar shaped, and, in cross-section, can have varying shapes and may be square or rectangular and may have a long dimension (depth) that can be larger than its cross-sectional height and width as seen from the two dimensional perspective provided by FIG. 2. In other embodiments the depth of the membrane support structure may be comparable to the distance of separation between the members of the membrane support structure of a single deformable membrane actuator.

Each support member 24A, 24B is oriented between the upper surface of first substrate 12 and the deformable membrane 26A, 26B, with its vertical dimension being substantially perpendicular to the plane of the upper surface of first substrate 12 so as to support the deformable membrane 26A, 26B. The cross section of support members 24A, 24B as seen looking perpendicular to the plane that is parallel to the upper surface of the first substrate may have a square or rectangular shape, but may also have a variety of other shapes in alternative embodiments (best shown by examples in FIG. 2B).

Deformable membrane 26A, 26B is attached to and disposed above the membrane support structure 23A, 23B.

Load support structure 28A, 28B, which supports the second substrate (load), is attached to and disposed below second substrate 30 and attached to and disposed above the electrically conductive layer 36A, 36B (membrane electrode). Electrically conductive layer 36A, 36B is disposed within, and forms the upper surface of deformable membrane 26A, 26B.

In this embodiment, the load support structure 28A, 28B includes a plurality of support members 31A, 31B. In this embodiment, the load support structure members support the second substrate and thereby couple the motion of the membrane to the second substrate. Each of support members 31A, 31B may also be bar shaped with a rectangular, square or other cross-section as shown from the two-dimensional perspective of FIG. 2.

In this embodiment, each support member 31A, 31B of load support structure 28A, 28B is attached to the top surface of deformable membrane 26A, 26B and attached to the bottom surface of interface layer 68. Interface layer 68 is attached to the bottom surface of second substrate 30, and may be eliminated in some embodiments.

In this embodiment, each member 24A, 24B of membrane support structure 23A, 23B engages portions of the lower surface of deformable membrane 26A, 26B at a first set of locations. Members 31A, 31B of load support structure 28A, 28B each engage a portion of the upper surface of deformable membrane 26A, 26B at a second set of locations. The horizontal position, as seen from FIG. 2, of each location of the second set of locations is located in between the horizontal positions of each of the locations of the first set of locations. In this embodiment, electrode layer 22A, 22B is attached to and disposed above the top surface of substrate 12 and attached to and disposed below membrane support structure 23A, 23B, including membrane support members 24A, 24B.

Deformable membrane 26A, 26B deforms (flexes) when charge from voltage or current source 34A, 34B is applied to electrode layer 22A, 22B and to electrically conductive layer 36A, 36B. The applied charge creates an attractive electrostatic force that causes the deformable membrane 26A, 26B to deform into well 33A, 33B and towards the electrode layer 22A, 22B. The electrically conductive layer 36A, 36B is disposed on the upper surface of the deformable membrane 26A, 26B. The electrode layer 22A, 22B is disposed on the first substrate 12 including underneath the membrane support structure 23A, 23B. When deformable membrane 26A, 26B deforms (flexes), it causes an alteration (reduction) of the distance between the proximate surfaces of the first substrate 12 and the second substrate 30 and consequently alters (reduces) the size of optical resonator gap 38 and optical resonator volume.

Deformable membrane 26A, 26B deflects into deformable membrane actuator well 33A, 33B. A deformable membrane actuator well 33A, 33B is a cavity formed by the membrane support structure members and the deformable membrane 26A, 26B.

Optical resonator gap 38 is a measure of the distance between the proximate surfaces of the optical portions 16 and 32. Alteration of optical resonator gap 38 occurs without invasion or interference to optical volume 39 by any portion of deformable membrane actuator cell groups 20A, 20B. As shown, substrate 12 may additionally or alternatively include optical portion 17 and substrate 30 may additionally or alternatively include optical portion 35.

In this embodiment, there is no requirement for the invention to inter-operate with the force of gravity. Nor is the invention required to be structured or used in a particular orientation with respect to the direction of gravity. Both substrates 12, 30 and their respective optical portions 16, 32 are indirectly attached to the deformable membrane via various components of deformable membrane actuator cell groups 20A, 20B. Consequently, the distance between both substrates and their respective optical portions 16, 32 is dependent primarily upon the shape (position) of deformable membrane 26A, 26B and not upon a gravitational force.

In other embodiments, device 10 can be designed to inter-operate with the force of gravity. In these other embodiments, when voltage or current source 34A, 34B is turned off, deformable membrane 26A, 26B could provide an upward force that supports substrate 30 against the forces of gravity at a first higher vertical altitude. When deformed, deformable membrane 26A, 26B could provide an upward force that supports substrate 30 against the forces of gravity at a second lower vertical altitude.

In other embodiments, other forces can be applied to deformable membrane 26A, 26B. For example electrical, mechanical, thermal or magnetic forces without limitation, can be employed to deform deformable membrane 26A, 26B.

First substrate 12 and second substrate 30 can be made of a variety of materials including semiconductors, insulators, ceramics and metals with varying thicknesses, shapes and sizes. For embodiments where first substrate 12 and second substrate 30 are opaque, optical portions 16 and 32 may be thin or thick coated onto transparent secondary substrates (best shown in FIG. 7) that span and/or occupy an aperture (hole) formed preferably through the proximate surfaces and opposite surfaces of each substrate 12 and 30.

Substrates 12, 30 are also referred to and classified as primary substrates. The primary substrates 12, 30 can be composed of optically translucent or opaque material. If apertures (holes) in primary substrates 12 and 30 are small enough, use of secondary substrates to support optical portions 16 and 32 is optional.

Typically, membrane support structure 23A, 23B and load support structure 28A, 28B are made of an electrical insulating material. In the preferred embodiment, as shown in FIG. 2, $I_I$ is the input incident light, $I_R$ is the reflected light, and $I_T$ is the transmitted light.

Deformable membrane 26A, 26B typically includes an electrically conductive layer 36A, 36B on its upper surface as shown. However, deformable membrane 26A, 26B itself can instead be made entirely of an electrically conductive material. First substrate 12 also typically includes an electrode layer (substrate electrode layer) 22A, 22B disposed under and in between the deformable membrane actuator membrane support members 24A, 24B. However, first substrate 12 itself can instead be made entirely of an electrically conductive material. Substrate electrode layer 22A, 22B and electrically conductive layer 36A, 36B are typically made of either silicon, silver, copper or aluminum, etc.

Substrate electrode layer 22A, 22B and membrane electrode 36A, 36B may be flash deposited, sputter deposited, evaporation deposited, or spray deposited. Voltage or current source 34A, 34B may be DC or AC, is typically connected to electrode layer 22A, 22B and membrane electrode 36A, 36B. Electrode layer 22A, 22B is not necessary if the first substrate 12 itself is conductive, and in this case voltage or current source 34A, 34B is connected to substrate 12.

In some embodiments of this invention, first substrate 12 and second substrate 30 are optical flat plates. This embodiment has an advantage over the prior art because the rigidity of the optical flat plates prevents deformation of the optical portions 16, 17, 32 and 35 when the second substrate moves as deformable membrane 26A, 26B deforms.

Figure 12A:
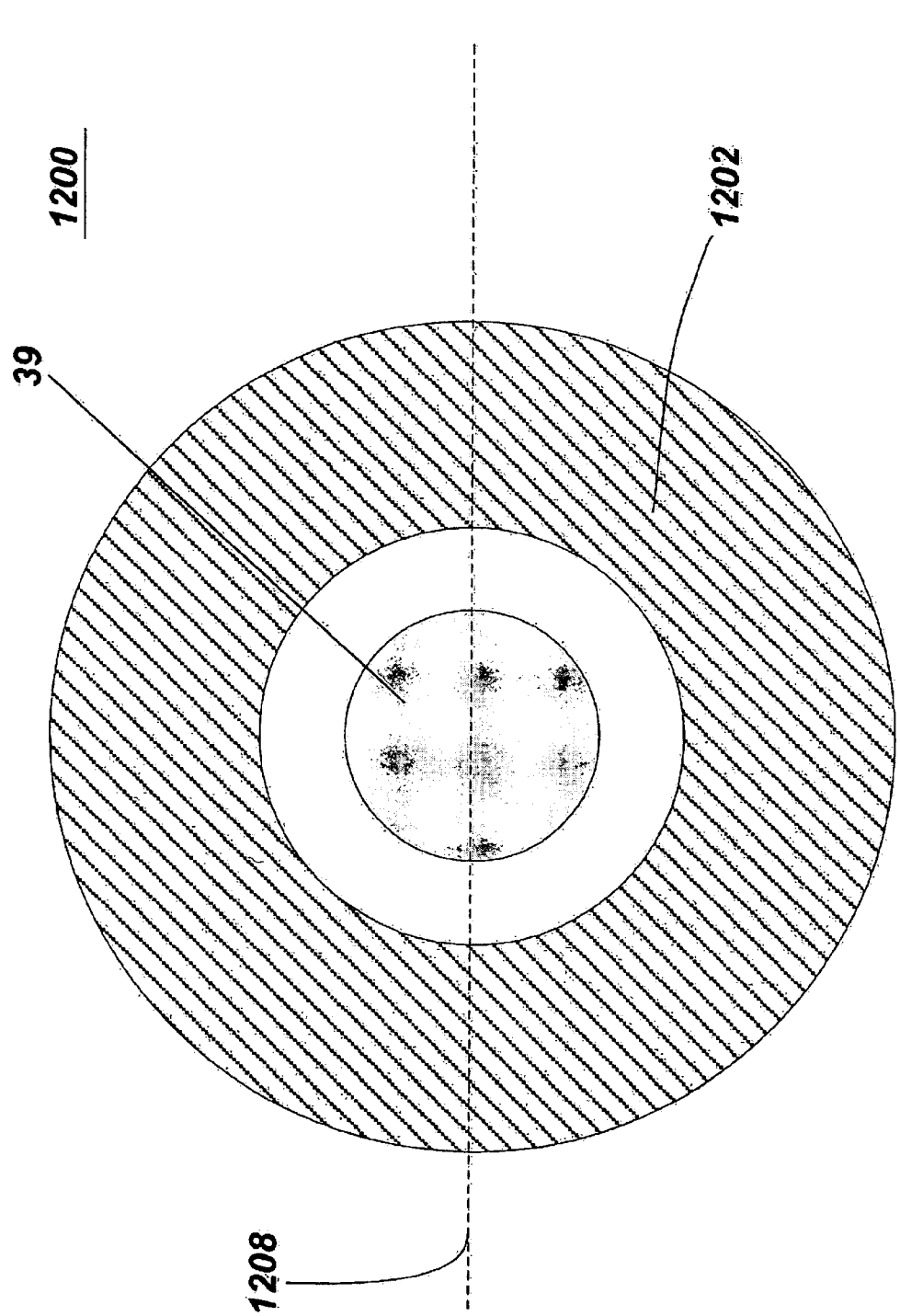
FIG. 12A is a schematic top-down view of an embodiment of a single tunable optical filter comprising a single deformable membrane actuator (either a single-cell or multi-cell actuator) in accordance with the subject invention.

In some embodiments, illustrated by example in FIG. 12A, a deformable membrane actuator 1202 (group or cluster of one or more deformable membrane actuator cells) is driven by a single shared electrode supplied by a single voltage or current source. The deformable membrane actuator 1202 may surround the optical volume 39 without intersecting the optical volume 39. The shape does not necessarily have to be annular.

Figure 12B:
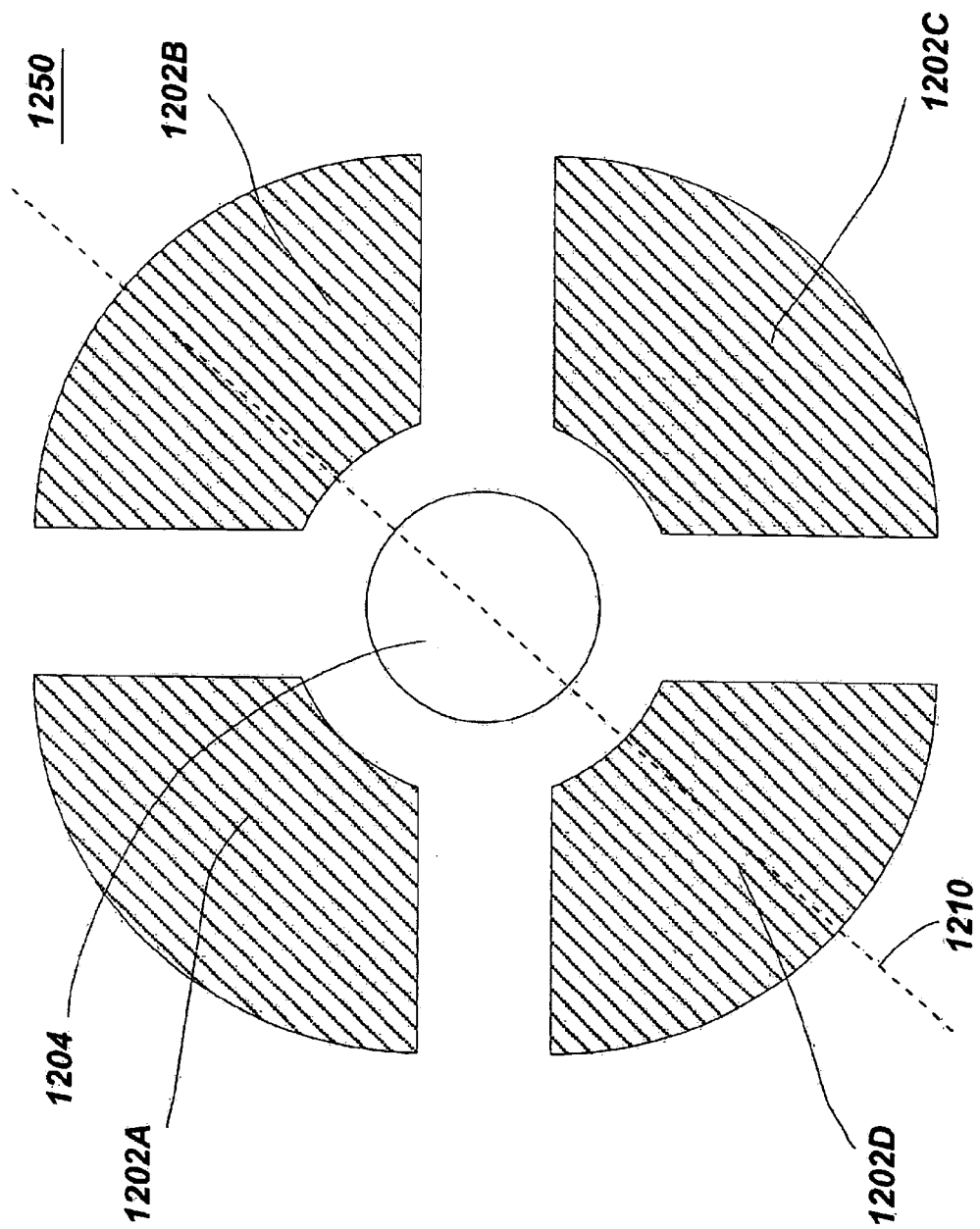
FIG. 12B is a schematic top-down view of an embodiment of a single tunable optical filter comprising multiple separate deformable membrane actuator cell groups in accordance with the subject invention.

In other embodiments, illustrated by example in FIG. 12B, two or more groups of deformable membrane actuator cells 1202A–1202D may surround the optical volume 39 without intersecting the optical volume 39. Each deformable membrane actuator cell group 1202A–1202D (group/cluster of deformable actuator wells) could be driven by its own separate electrode configuration and its own voltage or current source or by a source common to multiple actuator cell groups 1202A–1202D with the appropriate voltage or current divider circuits. In some embodiments, the separate actuator cell groups 1202A–1202D could share a common conductive membrane layer. In some embodiments, the separate clusters may abut each other. In other embodiments, gaps exist between the clusters as illustrated by example in FIG. 12B.

In other embodiments (best seen FIGS. 2B–2G), the membrane support structure may alternatively form an array of one or more wall (ring) or cavity (well) like structures or form an array of individual posts or bars that may in cross-section be square, rectangular, hexagonal, circular, oval, elliptical, triangular, triangular with concave sides or other shapes that may either lie flat or be upstanding on the first substrate.

Figure 2C:
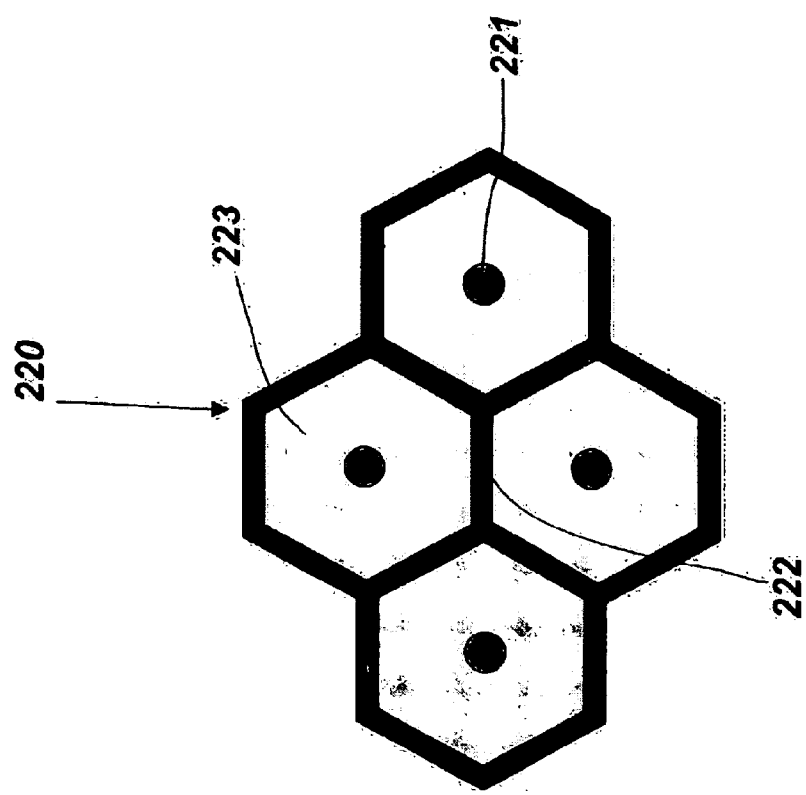
FIG. 2C illustrates a top-down view of a membrane support structure including wall (ring) like structures disposed above the first primary substrate that form an array hexagonally shaped membrane actuator cells.
Figure 2B:
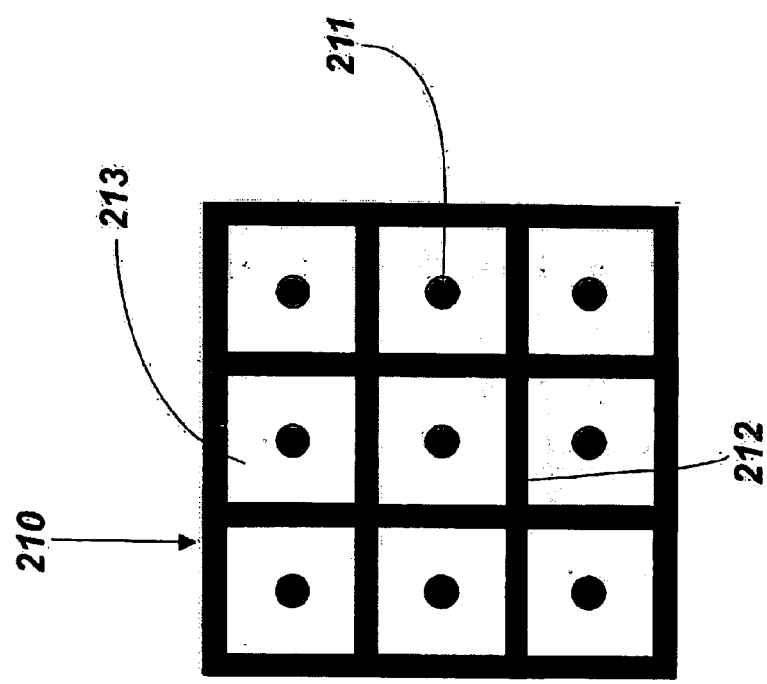
FIG. 2B illustrates a top-down view of a membrane support structure including wall (ring) like structures disposed above the first primary substrate that form an array of square shaped membrane actuator cells.

FIG. 2B illustrates a top-down view of a membrane support structure including wall (ring) like structures disposed above the first primary substrate that form an array of square shaped deformable membrane actuator wells 213. A deformable membrane actuator well 213 is formed by each wall like structure (wall) forming a square shaped perimeter 212. Each wall functions as part of a membrane support structure. A deformable membrane actuator well 213 is formed within the perimeter of each wall. A load support member 211 is disposed on the deformable membrane (not shown) above each deformable membrane actuator well 213.

FIG. 2C illustrates a top-down view of a membrane support structure including wall (ring) like structures disposed above the first primary substrate that form an array hexagonally shaped deformable membrane actuator wells 223. A deformable membrane actuator well 223 is formed by each wall like structure (wall) forming a hexagonally shaped perimeter 222. Each wall functions as part of a membrane support structure. A deformable membrane actuator well 223 is formed within the perimeter of each wall. A load support member 221 is disposed on the deformable membrane (not shown) above each deformable membrane actuator well 223.

Figure 2E:
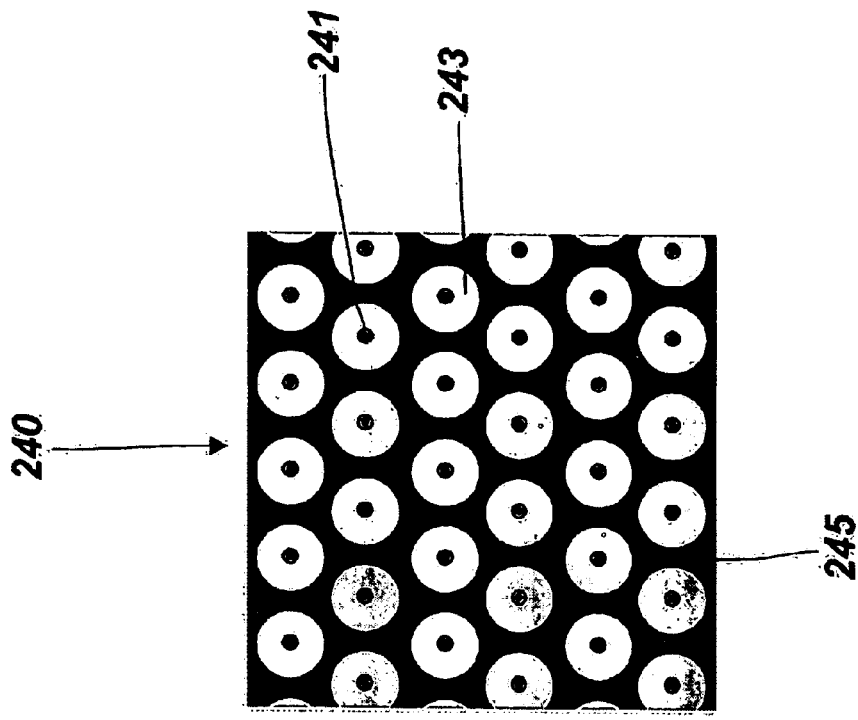
FIG. 2E illustrates a top-down view of a membrane support structure including cavities bored into the first primary substrate that form an array of circle shaped wells that are arranged into a hexagonal pattern.
Figure 2D:
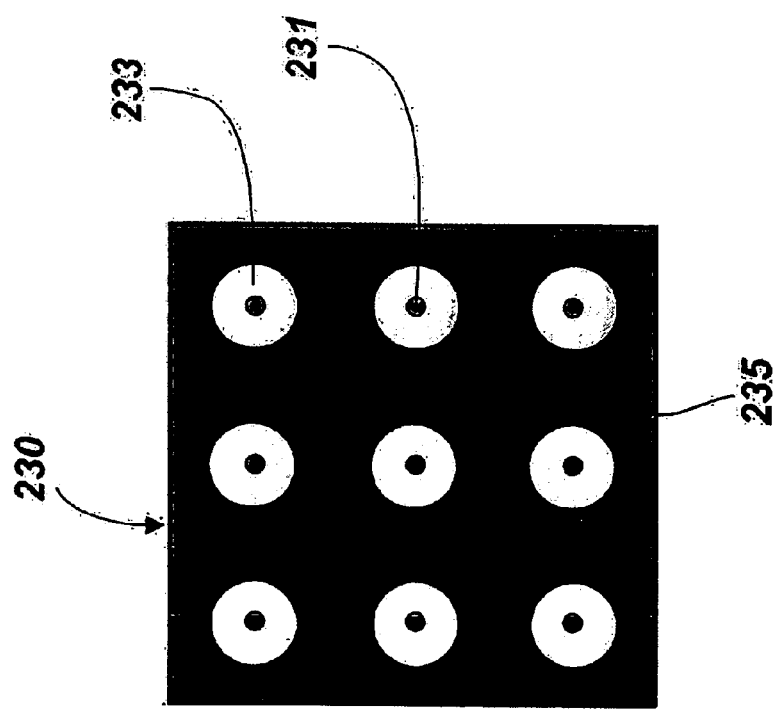
FIG. 2D illustrates a top-down view of a membrane support structure including cavities bored into the first primary substrate that form an array of circle shaped wells that are arranged into a square pattern.

FIG. 2D illustrates a top-down view of a membrane support structure including cavities bored into the first primary substrate that form an array of circle shaped wells that are arranged into a square pattern. A deformable membrane actuator well 233 is formed by each circular cavity 233. The substrate material nearest the perimeter of the deformable membrane actuator well 233 functions as part of a membrane support structure. A load support member 231 is disposed on the membrane (not shown) above each well deformable membrane actuator 233. The circle shaped deformable membrane actuator wells 233 are arranged into a square pattern having a matrix of rows and columns. Each column has a well residing in each and every row.

FIG. 2E illustrates a top-down view of a membrane support structure 240 including cavities bored into the first primary substrate 245 that form an array of circle shaped wells 243 arranged into a hexagonal pattern. A deformable membrane actuator well 243 is formed by each circular well 243. The substrate material nearest the perimeter of the deformable membrane actuator well 243 functions as part of a membrane support structure. A load support member 241 is disposed on the deformable membrane (not shown) above each well 243. The deformable membrane actuator wells are arranged in a hexagonal pattern.

Figure 2G:
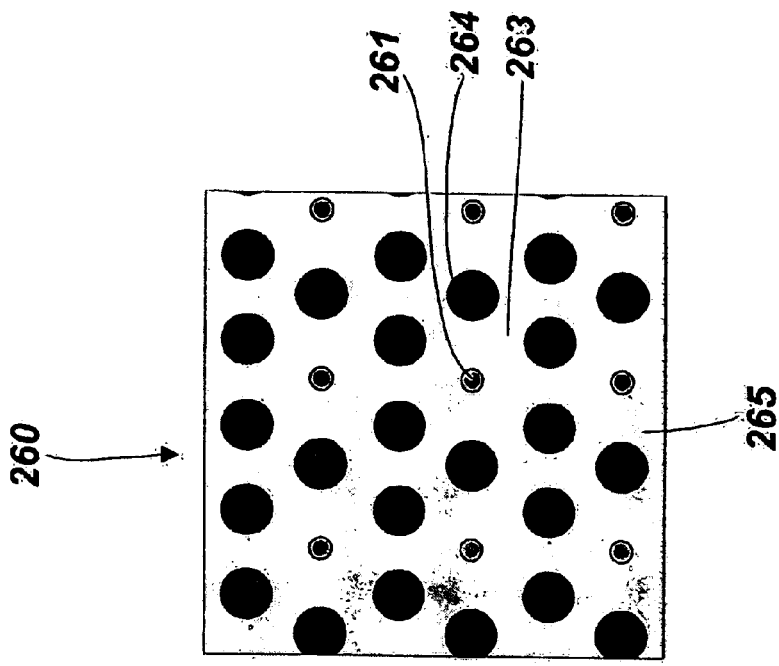
FIG. 2G illustrates a top-down view of a membrane support structure including circle shaped membrane support members upstanding and disposed above a first substrate that form an array of hexagonally shaped wells that are arranged into a square pattern.
Figure 2F:
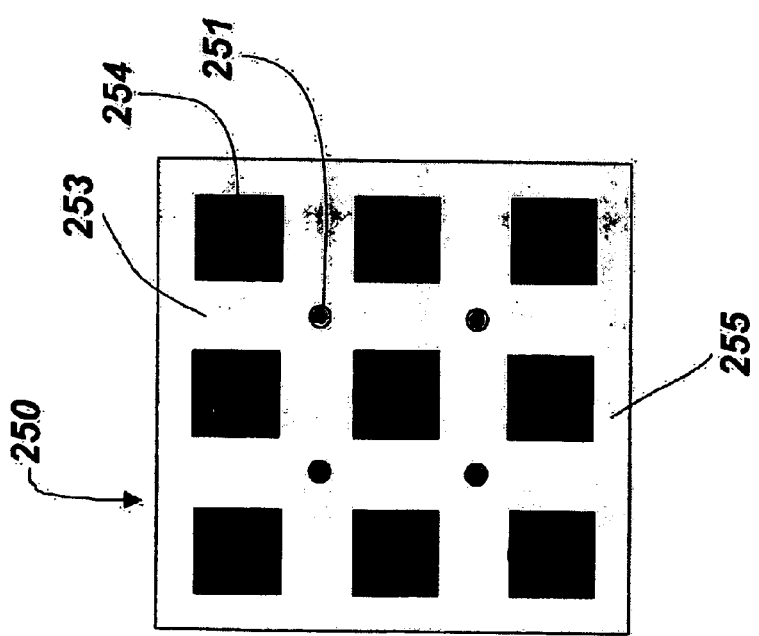
FIG. 2F illustrates a top-down view of a membrane support structure including square shaped membrane support members upstanding and disposed above a first substrate that form an array of square shaped wells that are arranged into a square pattern.

FIG. 2F illustrates a top-down view of a membrane support structure 250 including an array of square shaped membrane support members 254 upstanding and disposed above a first substrate 255. A plurality of deformable membrane actuator wells 253 are formed between the square shaped support members 254. A load support member 251 is disposed on the membrane (not shown) above each deformable membrane actuator well 253. Circular support posts can be used instead of square ones. Other shapes may be used.

FIG. 2G illustrates a top-down view of a membrane support structure including an array of circle shaped membrane support members 264 upstanding and disposed above a first substrate 265 that are arranged in a hexagonal pattern. A plurality of deformable membrane actuator wells 263 are formed between the circle shaped support members 264. A load support member 261 is disposed on the deformable membrane (not shown) above each hexagon shaped deformable membrane actuator well 263.

As illustrated in FIGS. 2B–2G, an array of one or more wall(ring) like structures can be embodied in varying shapes. For example, a wall (ring) and cavity (well) like structure may be square, rectangular, hexagonal, circular, oval, elliptical or other shapes. These walls (rings) and cavities (wells) may be part of individual single-cell actuators, or the walls (rings) and cavities (wells) may be connected side-by-side to form a continuous or discontinuous support web for the membrane or membranes of a multi-cell deformable membrane actuator as illustrated by example in FIG. 2B.

As illustrated in FIG. 2D, in some embodiments, the membrane support structure may be a substrate with holes (wells) cut or etched into it. For example, these wells may be square, rectangular, hexagonal, circular, oval, elliptical or other shapes.

As illustrated in FIGS. 2E and 2F, in some embodiments, the membrane support structure may be an array of individual posts or bars disposed above a first substrate. These posts or bars can have varying cross sectional shapes. For example, these posts or bars may be square, rectangular, hexagonal, circular, oval, elliptical or other shapes.

Figure 3:
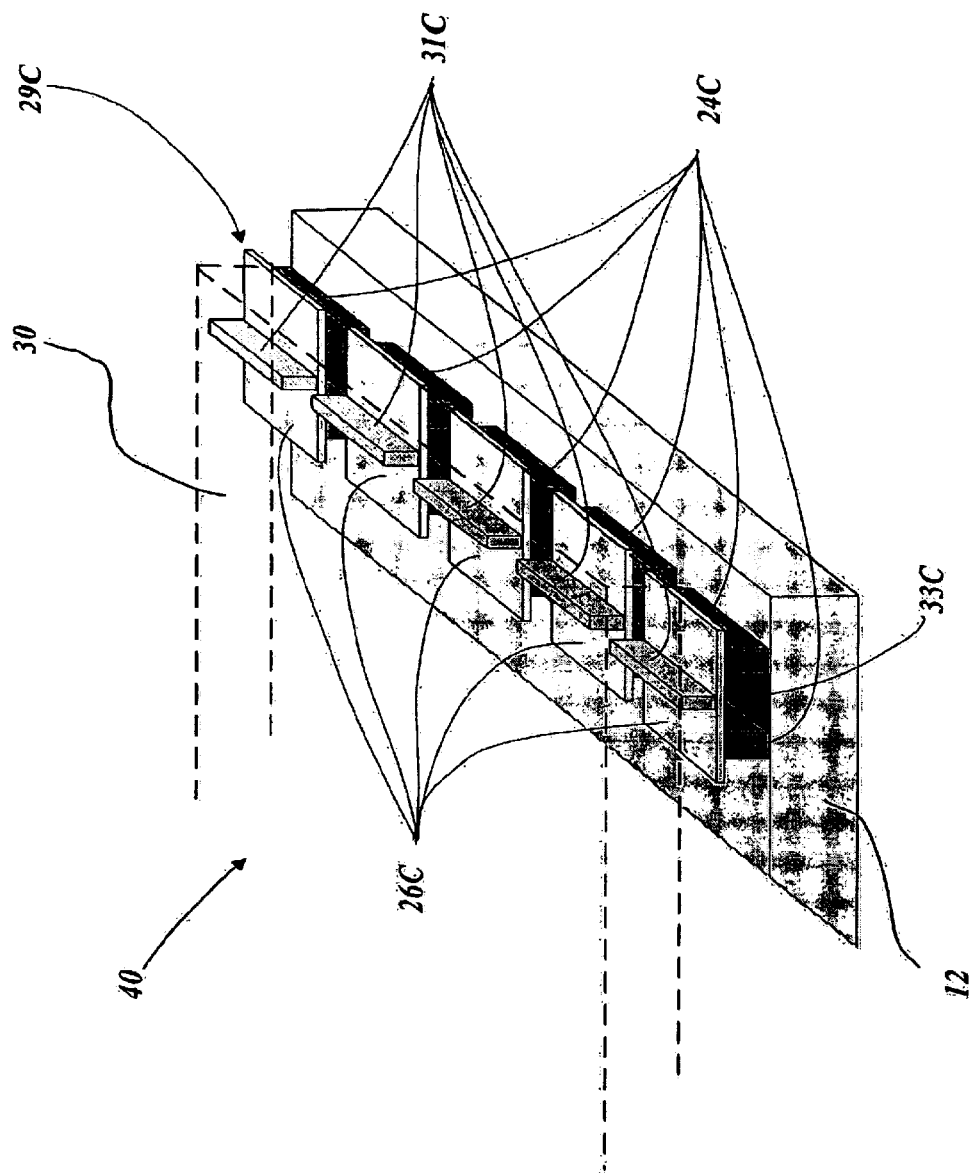
FIG. 3 is a schematic three-dimensional partial view of a plurality of discrete deformable membrane actuator cells that each comprise load support structures in accordance with an embodiment of the subject invention.

Referring to FIG. 3, in the example embodiment shown at 40, each combination of individual deformable membrane 26C, engaged with membrane support structure member 24C and load support structure member 31C forms a separate deformable membrane actuator 29C each having one deformable membrane actuator well 33C. For example, a 100 millimeter diameter substrate can have more than 10 million of such individual square deformable membrane actuator cells 29C.

In the above embodiment, a plurality of deformable membrane actuator cells 29C are located between the proximate surfaces of single first substrate 12 and the single second substrate 30 (not shown). An error or defect in one or more deformable membrane actuator cells 29C can be compensated by other correctly functioning deformable membrane actuator cells 29C when they are all attached to and are controlling the motion of the second substrate 30.

A sufficient number of correctly functioning deformable membrane actuator cells 29C can compensate for other deformable membrane actuator cells that would "over deflect" or "under deflect" if acting alone, if the same voltage was applied to all deformable membrane actuator cells. In other embodiments, different voltages can be applied to clusters or groups of deformable membrane actuator cells 20A, 20B to achieve a desired parallelism or tilt between the contiguous surfaces of the optical portions 16 and 32 that define the optical resonator gap 38.

These same principles hold for the large variety of actuators that employ the wide variety of membrane support structures and load support structures that are illustrated by example in FIGS. 2B–2G.

Figure 4:
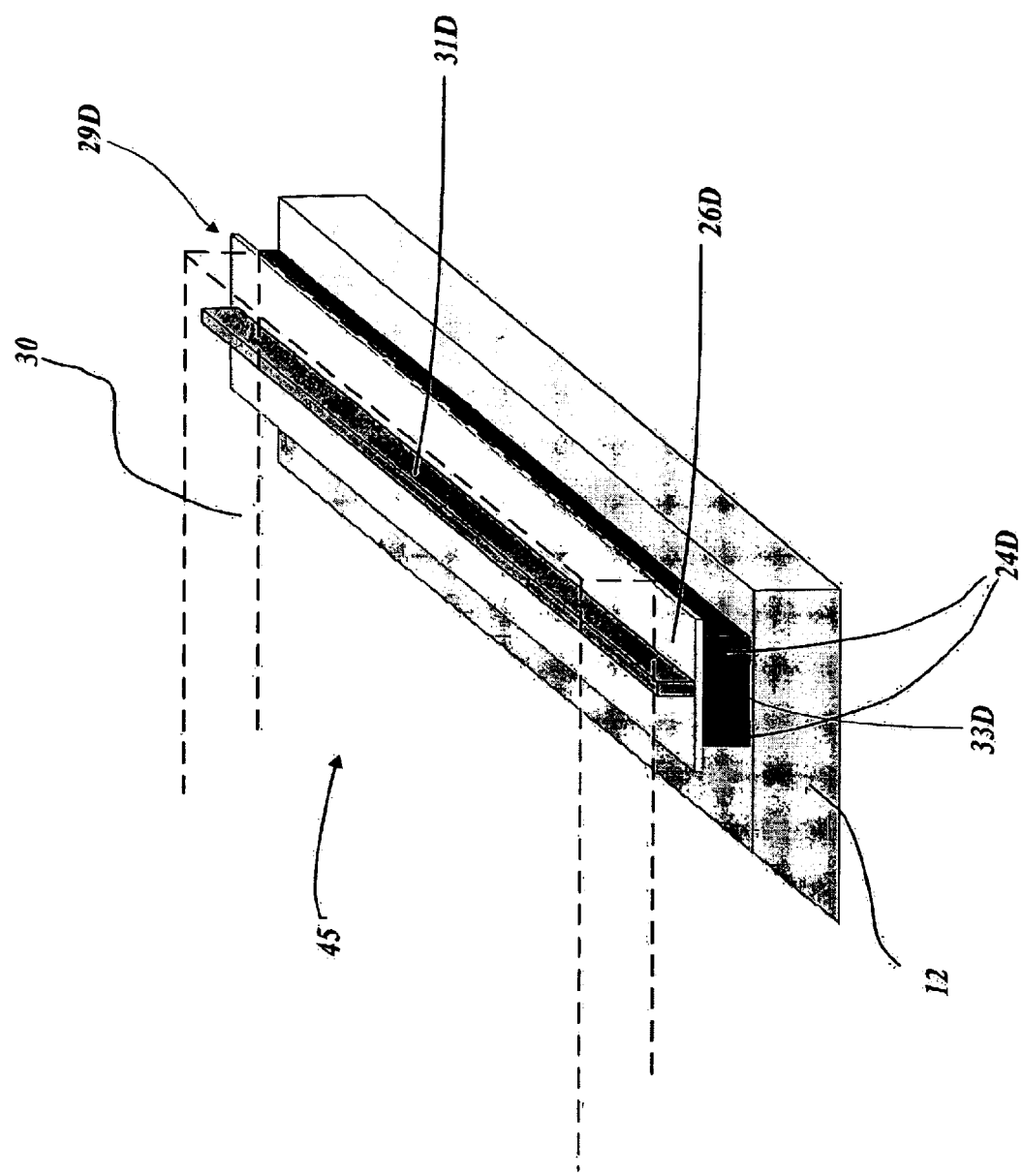
FIG. 4 is a schematic three-dimensional partial view of an elongated single-cell deformable membrane actuator including its associated load support structure in accordance with another embodiment of the subject invention.

Referring to FIG. 4, a single elongated deformable membrane actuator 45 is shown. In this embodiment, deformable membrane 26D, support members 24D of the membrane support structure, and support member 31D of the load support structure are each formed as one elongated structure. In this embodiment, the depth of membrane support structure member 24D is substantially larger than the height of membrane support structure member 24D and larger than the distance of separation (width) between membrane support structure member 24D.

The combination of the individual deformable membrane 26D, engaged with membrane support structure member 24D and load support structure member 31D is collectively referred to as one elongated deformable membrane actuator including deformable membrane actuator well 33D. Thus in some embodiments we can cover an area with a group (array) of such elongated deformable membrane actuator cells as an alternative to a group of smaller individual single-cell deformable membrane actuators of FIG. 3 or single-cell units of the actuator clusters shown by example in FIG. 2B.

The above embodiments allow fine-tuning of optical filter 10 with substantially greater accuracy towards controlling the size and the parallel orientation (parallelism) of the proximate surfaces of optical portions 16 and 32 that define optical volume 39 and optical resonator gap 38. Control of the size of optical resonator gap 38 and the parallel orientation of the proximate surfaces of optical portions 16 and 32 defining optical volume 39, is effected by the ability to adjust applied voltages 34 affecting the adjustable (vertical) dimension of one or more multi-cell deformable membrane actuators or one or more single-cell deformable membrane actuators.

In some embodiments, the adjustable (vertical) dimension of each group of one or more individual deformable membrane actuator cells 29D is controlled by one or more independent electrodes. For these embodiments, electrode layer 22A, 22B is an electrode group comprising at least two groups of one or more electrodes applying voltage to at least two groups of one or more deformable membrane actuator cells 29D. By employing groups (clusters) of electrodes and deformable membrane actuator cells, each group of deformable membrane actuator cells can compensate for (average out) errors caused by individual deformable membrane actuator cells 29D.

Figure 5:
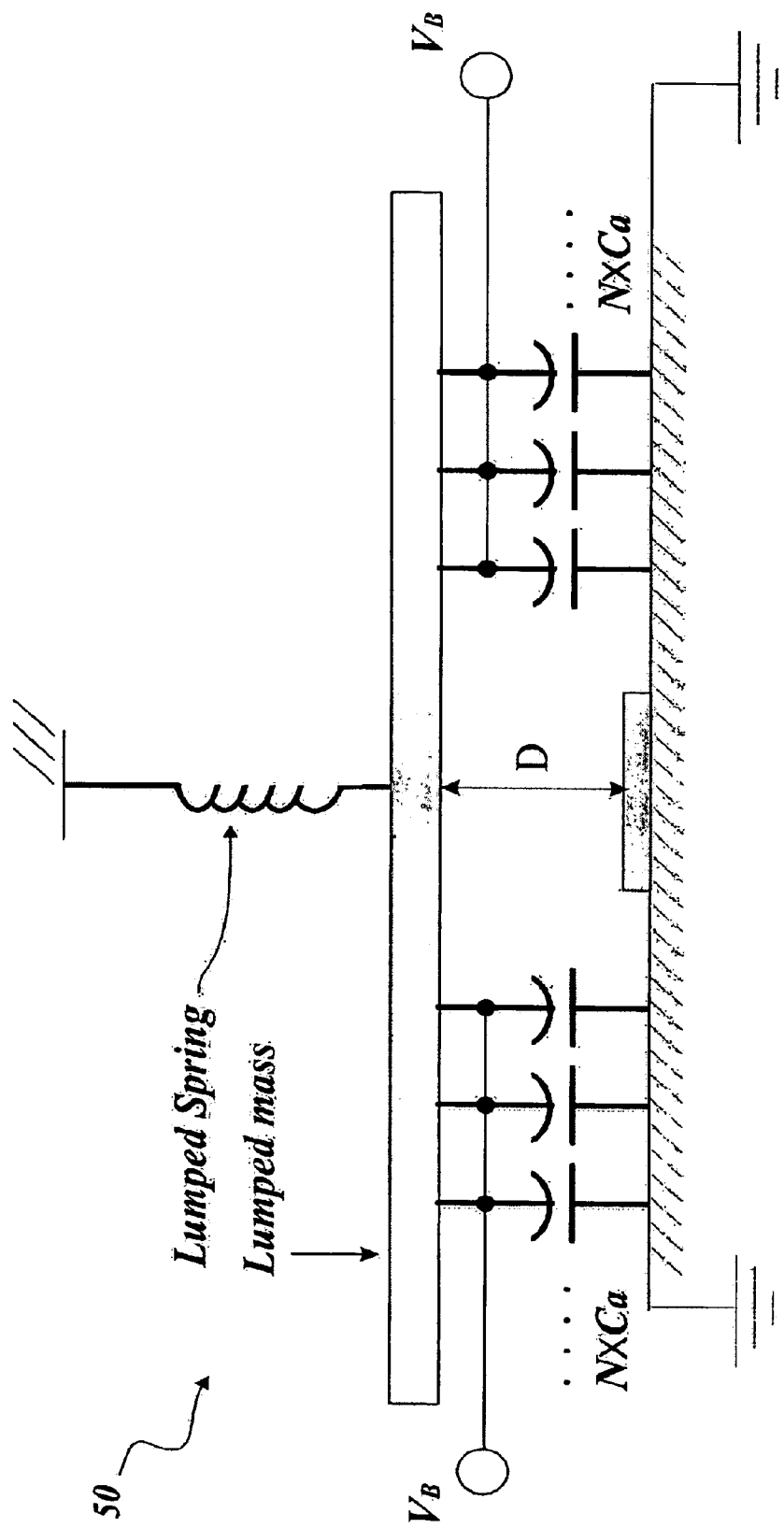
FIG. 5 is a schematic view illustrating the tuning principle of the tunable optical filter of the subject invention using an electromechanical conceptual model.

Referring to FIG. 5, an electromechanical schematic illustration is shown that models the tuning properties of the tunable optical filter of this invention when electrostatic actuation is used to deform the deformable membrane. Variable capacitors "Ca", which represent each deformable membrane actuator well, are in parallel with all other deformable membrane actuator wells (variable capacitors "Ca"). "N" represents the number of deformable membrane actuator wells in one array. "D" represents the optical resonator (mirror) gap 38 distance (depth) between the two optical plates, and the single lumped spring conceptually represents the elastic stiffness of the overall system. In this system, the lumped movable mirror mass is suspended by the lumped spring. During operation, the electrostatic attractive force imposed by the deformable membrane actuator electrodes balances the elastic restoring force of the lumped spring.

Alternatively, in other embodiments, instead of an electrostatic actuation method as modeled in FIG. 5, other actuation methods, such as thermal, or magnetic actuation can be employed to deform a deformable membrane. For these embodiments, the FIG. 5 model can be modified accordingly.

Figure 6:
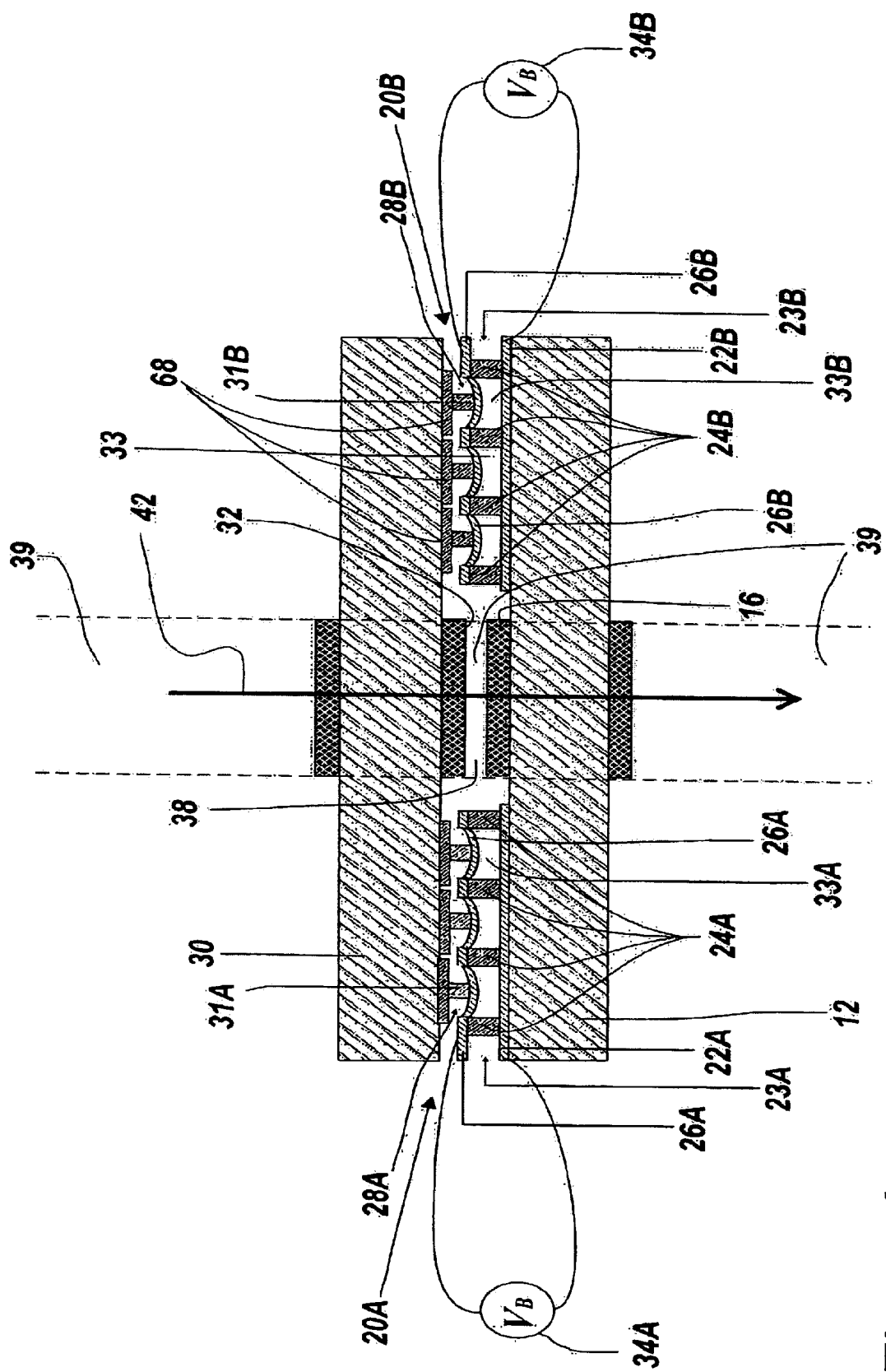
FIG. 6 is a schematic cross-sectional view of the embodiment of FIG. 2 showing two substrates re-positioned within closer proximity to each other in response to a deformable membrane deforming in accordance with the subject invention.

Referring to FIG. 6, tunable optical filter 10 includes at least two groups deformable membrane actuator cells 20A, 20B, each located proximate to and outside of optical volume 39. Each of deformable membranes 26A, 26B are supported by each group of membrane support structures 23A, 23B. Each group of load support structures 28A, 28B is disposed below second substrate 30 and each member 31A, 31B of load support structure 28A, 28B is attached to a portion of deformable membranes 26A, 26B at locations that are located between the locations of engagement of individual members 24A, 24B of membrane support structure 23A, 23B.

In the preferred embodiment, non-zero-driving voltage 34 is applied between substrate electrode layer 22A, 22B and deformable membrane 26A, 26B acting as or including deformable membrane electrode (36A, 36B as seen in FIG. 1) to cause deformable membrane 26A, 26B to deform (flex) as shown. The deformation of deformable membrane 26A, 26B thereby reduces (shrinks) the well depth 33A, 33B and moves second substrate 30 closer to membrane substrate 12 to reduce the size of optical resonator gap 38 and optical resonator volume. Conversely, lowering the voltage causes well depth 33A, 33B and the size of optical resonator gap 38 and optical resonator volume to increase. A zero voltage state maximizes well depth 33A, 33B and the size of optical resonator gap 38 and optical resonator volume.

In some embodiments, each individual deformable membrane actuator cell within the same deformable membrane actuator cell cluster 20A, 20B is supplied with the same driving voltage thereby creating a multi-cell actuator. Consequently, all the deformable membranes in same multi-cell deformable membrane actuator 20A, 20B are designed to deform in a uniform manner which results in the rectilinear, bi-directional movement (translation) of second substrate 30 towards first substrate 12. This actuation scheme enables second optical portion 32 to move rigidly without bending or deforming.

The positions of substrate electrode layer 22A, 22B, membrane support structure 23A, 23B and deformable membrane 26A, 26B form deformable membrane actuator wells 33A, 33B respectively. The size of optical resonator gap 38 determines the filtered wavelength of the input light according to the well-known principle of Fabry-Perot interference. It is important to note that by dividing a plurality of deformable membrane actuator cells into two or more groups (clusters) to form two or more multi-cell deformable membrane actuators, (also see FIG. 12A and FIG. 12B), the parallel orientation between two optical portions 16 and 32 can be controlled precisely by the application of preset DC components to the wave forms that separately drive each of the two or more groups of deformable membrane actuator cells within 20A, 20B.

A wedge angle is a measurement of the proximity of optical portions 16 and 32 to being positioned parallel to each other. Each group of deformable membrane actuator cells 20A, 20B can form a separate deformable membrane actuator. Each group of deformable membrane actuator cells 20A, 20B can be separately controlled to tilt and to control the wedge angle between the optical portions 16 and 32.

In one embodiment, the displacement of second optical portion 32 is approximately the same as the center displacement of each deformable membrane 26A, 26B. Any geometric design and material, such as polymer, can be used to form a strong suitable linkage interface, 68. In some embodiments, the top surface of deformable membrane 26A, 26B is coated with an electrically conductive layer of material and therefore any thin film material or composite film with an electrically conductive property can be used for the membrane electrode 36A, 36B. When the deformable membrane is made of a thin conducting material (e.g., a metal) no additional electrode layer is needed since the deformable membrane itself is also an electrode.

Figure 7:
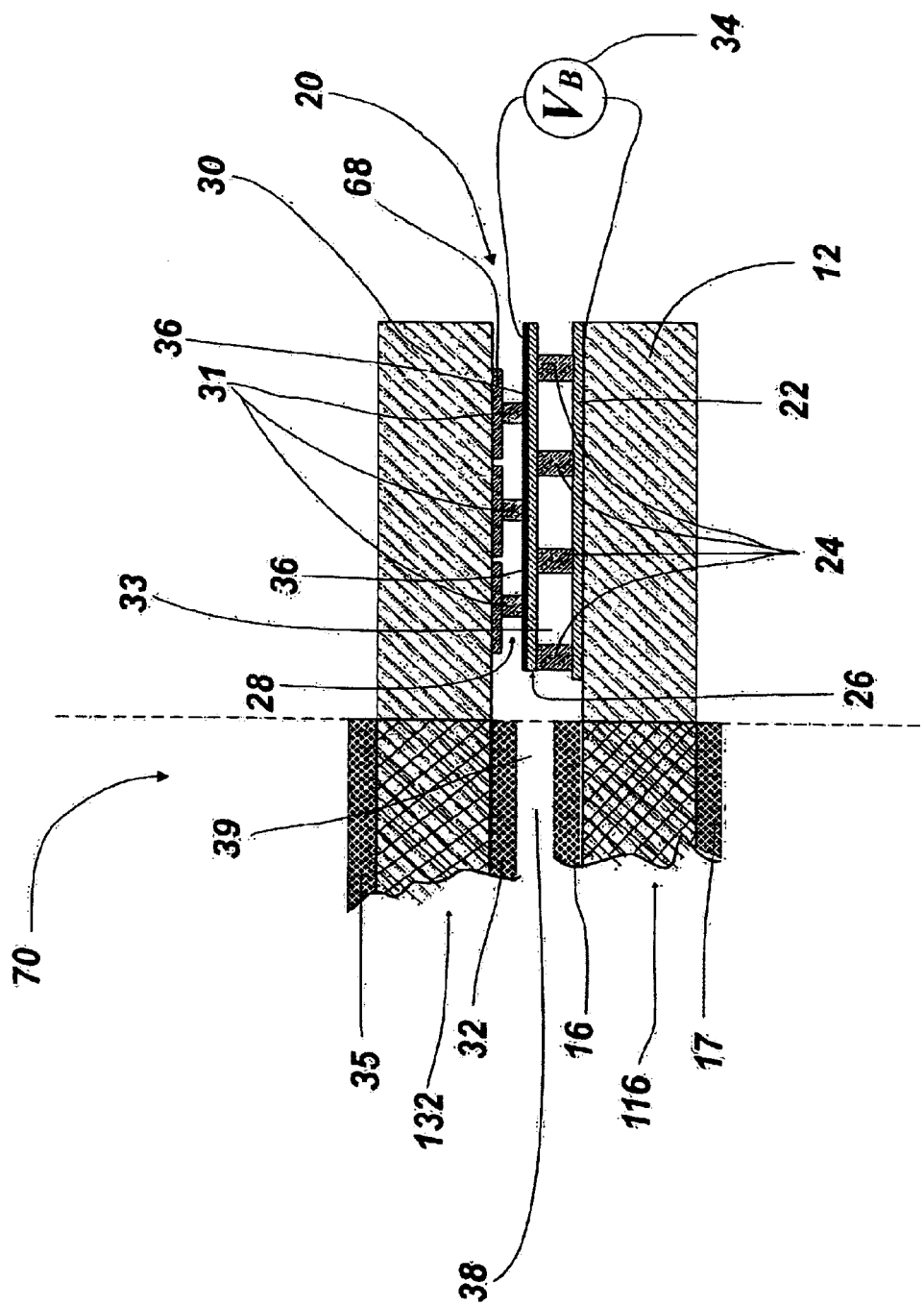
FIG. 7 is a cross sectional view illustrating another embodiment of the subject invention in which an optical portion is embedded within each substrate.

Referring to FIG. 7, in yet another embodiment, the first optical portion 16 is a mirror coating deposited on a secondary substrate 116 that is embedded in first primary substrate 12. The second optical portion is a mirror coating 32 deposited on secondary substrate 132 that is embedded within second primary substrate 30. Coatings 17 and 35 on the secondary substrates 116 and 132 may be antireflection coatings, for example. When substrates 12 and 30 are opaque, mirrors 116 and 132 are embedded within or span an aperture (hole) entirely through each substrate.

In this embodiment, tunable optical filter 70 includes spaced membrane support members 24 that are attached to and disposed on top of electrode layer 22 and attached below deformable membrane 26. Deformable membrane 26 extends across spaced members 24 and includes electrically conductive surface layer 36. Each member 31 of load support structure 28 is adjacent to the top surface of deformable membrane 26 on one lower end, and to the bottom side of second substrate 30 via interface layer 68 at the top end.

To place secondary substrates 116, 132 within the primary substrates 12 and 30, a hole is cut into these substrates, preferably at and entirely through the center of the proximate surface of each substrate and the secondary substrates secured with glue, epoxy, frit, or other appropriate means. Secondary substrates 116 and 132 are made of transparent materials, span and/or fill the aperture (hole) cut through substrates 12 and 30. If apertures (holes) in primary substrates 12 and 30 are small enough, use of secondary substrates to support optical portion 16 and 32 is optional.

Referring to FIGS. 8A and 8B, a single cell of multi-cell deformable membrane actuator comprising a single deformable membrane actuator well 33 is illustrated at a zero voltage bias position with an initial well gap depth of D in FIG. 8A. The stack structure of this single deformable membrane consists of substrate 12 attached to and disposed below electrode layer 22. A membrane support structure including members 24 is attached to and disposed above electrode layer 22. Deformable membrane 26 is attached to and disposed above membrane support structure members 24.

Load support structure 28 is attached to and disposed below flat interface layer 68 which is attached to and disposed below second substrate 30. Load support structure 28 contacts a portion of the upper surface of deformable membrane 26 located between portions of the deformable membrane 26 that make contact with two spaced members 24 of membrane support structure 23A portion of the deformable membrane 26A, 26B that contacts a member of membrane support structure 23A, 23B remains stationary during actuation and deformation of the deformable membrane. A portion of deformable membrane 26A, 26B that spans well 33 is deformable during actuation. The electrostatic actuation force is derived by altering the charge on the capacitor formed by electrodes 22 and 36 by means of the voltage or current source 34, FIG. 8B. When any non-zero driving voltage ($V_B$) is applied to the deformable membrane, the portion of the deformable membrane 72 deforms and moves downward into well 33. Thus the deformation of the portion of the deformable membrane 72 decreases the volume of well 33.

The well depth, which is fixed, is designated by D and the variable electrode separation measured at the center region of the well is designated as $D(V_B)$. Thus, the overall displacement of second substrate 30 is calculated by $\Delta D = D - D(V_B)$. According to the definition of optical path length, the phase shift of the light, between successive emerging rays, is $2\pi(2\Delta D/\lambda)$, where $\lambda$ is the wavelength of the light, and filter 10 has its maximum transmission for those wavelengths for which the above-mentioned phase shift is equal to $2 m\pi$ radians, where m is an integer.

In some embodiments, one of the leads (wires) from a voltage source 34 can be applied to a deformable membrane 26 spanning multiple groups of deformable membrane actuator wells 33 while the other lead from the same voltage source 34 can be split and applied to separate electrode layers 22 associated with each group of deformable membrane actuators 20A, 20B. In some embodiments, each actuator voltage can be adjusted by adding variable resistance along its path of charge conduction from source 34.

Figure 9:
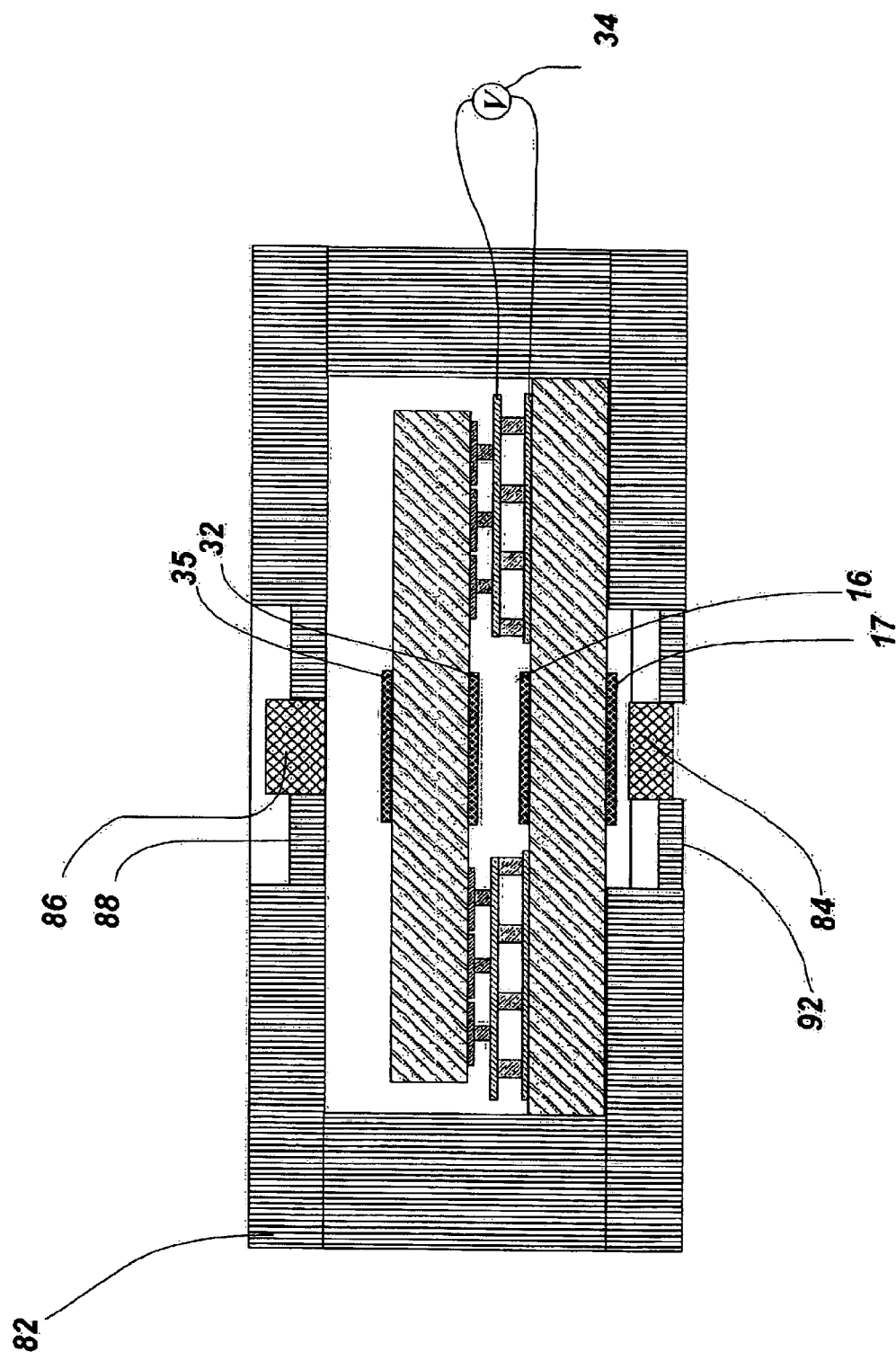
FIG. 9 is a schematic cross-sectional view of an encapsulated tunable optical filter in accordance with one embodiment of the invention.

Referring to FIG. 9, in some embodiments the tunable optical filter may be enclosed in sealed housing 82. In this embodiment housing 82 is hermetically sealed. Sealed housing 82 includes a first optical window 84 and second optical window 86. A light beam enters window 86 and exits window 84 or vice versa. The two windows can be made of any optically transparent material, such as glass, and optical fiber can be coupled to either window 86 or 84 using an optical connector and coupler (not shown), epoxy or a mechanical fixture. The outer wall edge of each window 86 and 84 has cladding 88 and 92 respectively to attach windows 84 and 86 to housing 82 in a leak tight manner.

Figure 10:
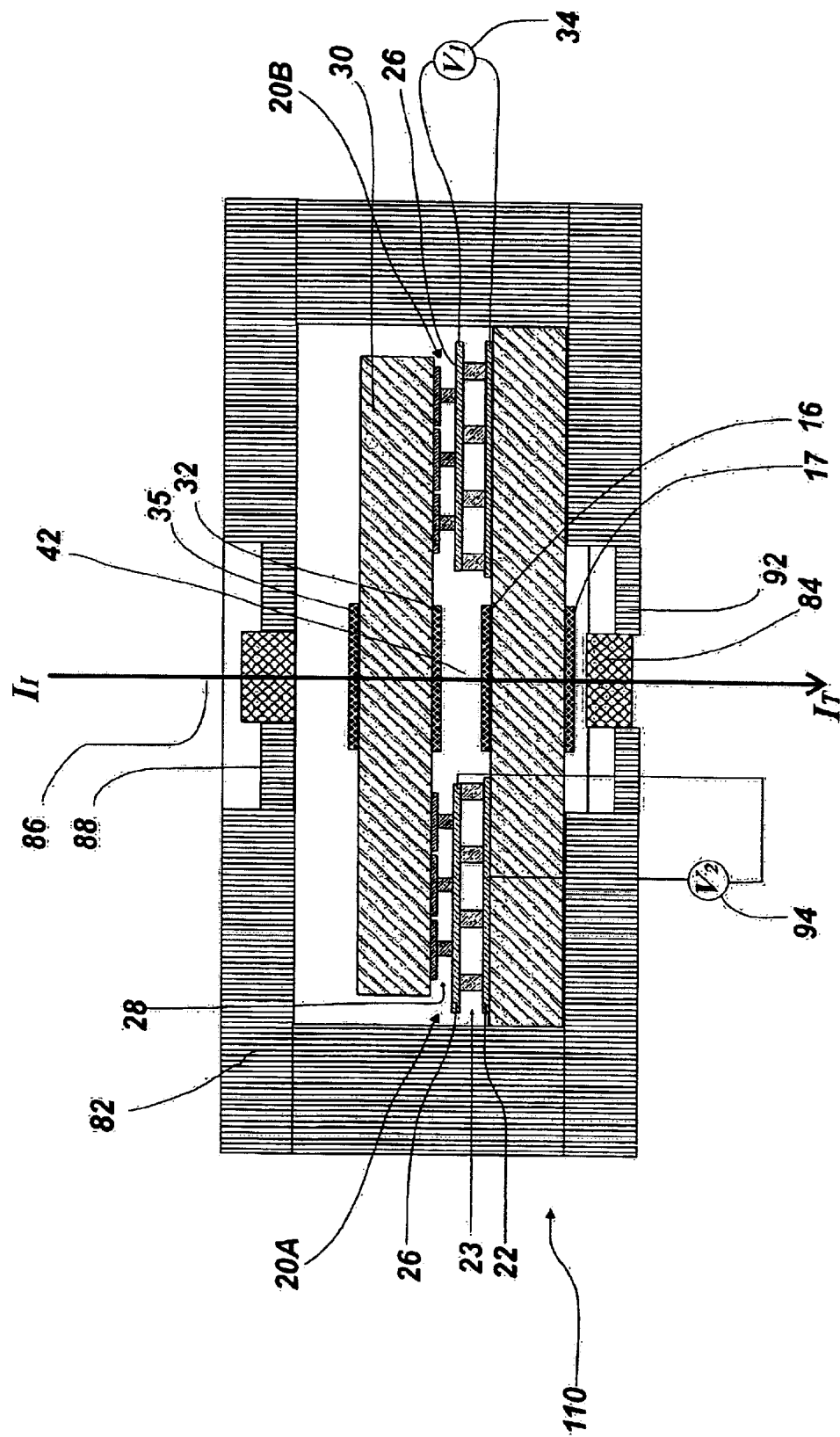
FIG. 10 is a schematic cross-sectional view of another encapsulated tunable optical filter in accordance with another embodiment of the invention.

Referring to FIG. 10, in this particular embodiment, two or more voltage or current sources 34 and 94 are applied to separate groups of deformable membrane actuator cells 20A, 20B. Each voltage or current source 34 and 94 independently supplies voltage or charge to a separate group (cluster) of deformable membrane actuator cells 20A, 20B to enable each group to be independently adjustable. The deformation of each group 20A, 20B can be adjusted to achieve a parallel orientation of the proximate surfaces of optical portions 16 and 32 and to achieve a particular optical resonator gap 38 size between the proximate surfaces of optical portions 16 and 32.

Figure 11:
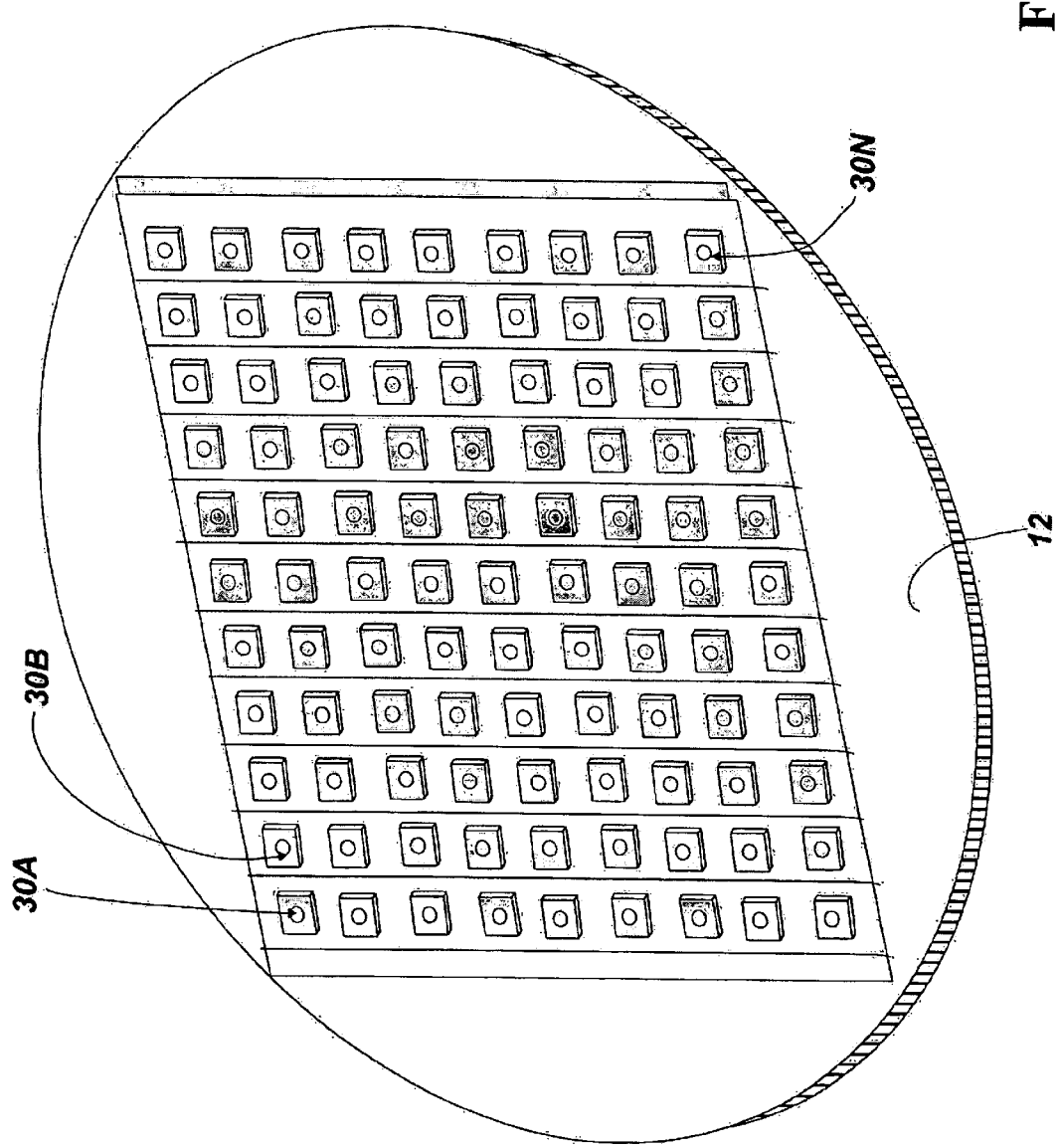
FIG. 11 is a schematic top view of a group of tunable optical filters on a single substrate in accordance with the subject invention.

Referring to FIG. 11, a matrix of optical filters is shown wherein first substrate 12 supports a plurality of second substrates 30A–30N. One or more deformable membrane actuator structures (not shown) are each disposed between first substrate 12 and each second substrate 30A–30N. This configuration can be used for high volume manufacturing of the various embodiments of the optical filters of this invention. Dicing of the substrates will result in a large number of individual optical filters which can then each be electrically wired for operation. This configuration, undiced, is also useful for fiber-optic telecommunications applications in which tunable spectral filtering can be accomplished in an array of optical fibers at either the laser source or detector end of such a communication system.

Referring to FIG. 12A, a schematic top-down view 1200 of an embodiment of a single tunable optical filter comprising one single deformable membrane actuator cell cluster 1202 is shown. Deformable membrane actuator cell cluster 1202 encircles optical volume 39 and may be an annular single-actuator cell or a cluster of actuator cells that are driven by one of more voltage source or current sources. The set of deformable membrane actuator cells 1202 may also be arranged in a square or an irregular shape. Cross-section line 1208 indicates a cross sectional viewing perspective of this embodiment of device 10 that is consistent with the viewing perspective of FIG. 2.

Referring to FIG. 12B, a special case of FIG. 12A, is a schematic top-down view 1250 of an embodiment of a single tunable optical filter comprising multiple separate deformable membrane actuator cell clusters 1202A–1202D. Separate deformable membrane actuator cell clusters 1202A, 1202B, 1202C, 1202D are arranged to substantially encircle optical volume 39. Cross-section line 1210 indicates a planar cross section of this embodiment of device 10 that is shown from the viewing perspective of FIG. 2.

A large plurality (millions) of membrane actuator cells can be grouped (clustered) together to control the position and movement of loads significantly heavier than an substrate and optical portion used within an optical filter.

Although specific features of the invention are shown in some drawings and not in others, this is for convenience only, as each feature may be combined with any or all of the other features in accordance with the invention. The words "including," "comprising," "having," and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A tunable optical filter comprising:
a first primary substrate including a first optical portion;
a second primary substrate including a second optical portion located a distance from the first optical portion;
at least one deformable membrane actuator that is configured to alter the distance between the first optical portion and the second optical portion, the deformable membrane actuator located outside of an optical volume that is defined by the location of the first optical portion and the location of the second optical portion wherein the deformable membrane actuator comprises a deformable membrane having electrically conductive properties, a electrode layer disposed onto the first primary substrate, a membrane support structure disposed between the deformable membrane and the electrode layer to form at least one deformable membrane actuator cell, and wherein a voltage applied between the deformable membrane and the electrode layer causes the deformable membrane to deflect towards the electrode layer.

2. The tunable optical filter of claim 1 wherein the at least one deformable membrane actuator cell comprises at least a portion of the deformable membrane having electrically conductive properties, at least a portion of the membrane support structure and at least a portion of the electrode layer, the portion of the membrane support structure being disposed between the portion of the deformable membrane and the portion of the electrode layer and forming a deformable membrane actuator well, and wherein a voltage applied between the portion of the electrode layer and the portion of the deformable membrane causes the portion of the deformable membrane to deflect into the deformable membrane actuator well and towards the portion of the electrode layer.

3. The tunable optical filter of claim 1 where the deformable membrane actuator comprises a load support structure, the load support structure depending from the second primary substrate and including at least one member, the at least one member attaching to the deformable membrane at a location of attachment so that deformation of the deformable membrane alters the distance between the first primary substrate and the second primary substrate.

4. The tunable optical filter of claim 3 wherein the membrane support structure and the load support structure each comprise one or more members that are each disposed and attached at locations along the deformable membrane so that the deformation of the deformable membrane alters the distance between the first primary substrate and the second primary substrate.

5. The tunable optical filter of claim 3 wherein members of the membrane support structure attach to the deformable membrane at a first set of locations, and where members of the load support structure attach to the deformable membrane at a second set of locations, and where each of the second set of locations are located in between locations of the first set of locations.

6. The tunable optical filter of claim 1 wherein the depth of the membrane support structure is substantially larger than the height of the membrane support structure and substantially larger than the distance of separation between the members of the membrane support structure.

7. The tunable optical filter of claim 3 wherein the depth of the load support structure is substantially larger than the height of the load support structure and substantially larger than the distance of separation between the members of the load support.

8. The tunable optical filter of claim 1 in which there are at least two deformable membrane actuators, each deformable membrane actuator located adjacent to and disposed on opposite sides of the first and second optical portions.

9. The tunable optical filter of claim 1 wherein the first optical portion is one or more coatings disposed on the first primary substrate.

10. The tunable optical filter of claim 1 wherein the second optical portion is one or more coatings disposed on the second primary substrate.

11. The tunable optical filter of claim 1 wherein the first optical portion is coating deposited on a secondary transparent substrate that is embedded in the first primary substrate.

12. The tunable optical filter of claim 1 wherein the second optical portion is coating deposited on a secondary transparent substrate that is embedded in the second primary substrate.

13. The tunable optical filter of claim 1 wherein the first optical portion is a thin-film mirror that bridges a hole or aperture located within the first primary substrate.

14. The tunable optical filter of claim 1 wherein the second optical portion is a thin-film mirror that bridges a hole or aperture located within the second primary substrate.

15. The tunable optical filter of claim 1 in which the first optical portion includes an opposing optical element such as antireflection coating on an opposing surface of the first primary substrate.

16. The tunable optical filter of claim 1 in which the second optical portion includes an opposing optical element such as antireflection coating on an opposing surface of the second primary substrate.

17. The tunable optical filter of claim 1 in which the first primary substrate is opaque and has a transparent secondary substrate embedded within it.

18. The tunable optical filter of claim 1 in which the second primary substrate is opaque and has a transparent secondary substrate embedded within it.

19. The tunable optical filter of claim 1 in which the first primary substrate is a transparent optical flat plate.

20. The tunable optical filter of claim 1 in which the second primary substrate is a transparent optical flat plate.

21. The tunable optical filter of claim 1 further including a housing about the first and second substrates, the housing including a first optical window aligned with the first optical portion and a second optical window aligned with the second optical portion.

22. The tunable optical filter of claim 1 wherein the electrode layer comprises a plurality of independent electrodes, each of the plurality of independent electrodes applying a separate voltage to a group of one or more deformable membrane actuator cells to control a wedge angle between the first optical portion and the second optical portion.

23. The tunable optical filter of claim 1 wherein the deformable membrane is segmented into a plurality of contiguous portions, each contiguous portion spanning at least one deformable membrane actuator cell.

24. The tunable optical filter of claim 1 where an electrically conductive layer is deposited onto the deformable membrane.

25. The tunable optical filter of claim 1 wherein the membrane support structure comprises at least one wall disposed above the first primary substrate that forms a membrane actuator well.

26. The tunable optical filter of claim 25 where the at least one wall disposed above the first primary substrate forms a square shaped membrane actuator well.

27. The tunable optical filter of claim 25 where the at least one wall disposed above the first primary substrate forms a hexagonally shaped membrane actuator well.

28. The tunable optical filter of claim 1 wherein the membrane support structure comprises at least one cavity bored into the first primary substrate that forms a membrane actuator well.

29. The tunable optical filter of claim 28 wherein the at least one cavity is arranged into a square pattern.

30. The tunable optical filter of claim 28 wherein the at least one cavity is arranged into a hexagonal pattern.

31. The tunable optical filter of claim 1 wherein the membrane support structure comprises at least one support member disposed above a first substrate that forms at least one membrane actuator well.

32. The tunable optical filter of claim 31 wherein the at least one support member forms a square shaped membrane actuator well.

33. The tunable optical filter of claim 31 wherein the at least one support member forms a hexagonal shaped membrane actuator well.

34. A deformable membrane actuator for a tunable optical filter, the actuator located outside an optical volume defined by the optical filter, the actuator comprising a deformable membrane coupled to the optical filter and having electrically conductive properties, a membrane support structure and an electrode layer, the membrane support structure being disposed between the deformable membrane and the electrode layer and forming at least one well and where a voltage applied between the electrode layer and the deformable membrane causes the deformable membrane to deflect into the well and towards the electrode layer thereby tuning the optical filter.

35. The deformable membrane actuator of claim 34 comprising a load support structure, the load support structure disposed above the deformable membrane and supporting a load located a distance from the electrode layer and where deflection of the deformable membrane alters the distance between the load and the electrode layer.

36. The deformable membrane actuator of claim 35 having a large plurality of deformable membrane actuator wells to control the movement and position of a load substantially heavier than an optical substrate.

37. An array of tunable optical filters comprising:
    a first substrate including a first plurality of first optical portions;
    a plurality of second substrates, each second substrate including a second optical portion, each second optical portion being disposed proximate to each first optical portion to form an optical volume through which light travels; and
    a plurality of deformable membrane actuators that are each disposed between the first substrate and each second substrate and disposed outside of each optical volume formed between each said first optical portion and each said second optical portion that is proximate to the first optical portion, each said deformable membrane actuator configured to alter the distance between each said first optical portion and each said second optical portion, each deformable membrane actuator including a deformable membrane having electrically conductive properties, a electrode layer disposed onto the first primary substrate, a membrane support structure disposed between the deformable membrane and the electrode layer to form at least one deformable membrane actuator cell, and wherein a voltage applied between the deformable membrane and the electrode layer causes the deformable membrane to deflect towards the electrode layer.

* * * * *